United States Patent [19]
McEvoy et al.

[11] Patent Number: 4,776,465
[45] Date of Patent: * Oct. 11, 1988

[54] EGG PROCESSING SYSTEM

[75] Inventors: John C. McEvoy, Canton; George N. Bliss, Franklin; Leslie P. Thomas, Canton, all of Mich.

[73] Assignee: Diamond Automations, Inc., Farmington Hills, Mich.

[*] Notice: The portion of the term of this patent subsequent to Feb. 12, 2003 has been disclaimed.

[21] Appl. No.: 811,640

[22] Filed: Dec. 20, 1985

Related U.S. Application Data

[62] Division of Ser. No. 394,162, Jul. 1, 1982, Pat. No. 4,569,444.

[51] Int. Cl.[4] ............ A01K 43/08; B65G 47/46
[52] U.S. Cl. ........................ 209/510; 198/364; 198/482.1; 209/513
[58] Field of Search ........... 209/510, 512, 513, 514; 198/364, 370, 470.1, 482.1, 483.1

[56] References Cited

U.S. PATENT DOCUMENTS

| | | | |
|---|---|---|---|
| 2,886,173 | 5/1959 | Scott | 209/912 X |
| 2,895,274 | 7/1959 | Mumma | 53/59 |
| 2,993,592 | 7/1961 | Mumma | 209/75 |
| 3,220,154 | 11/1965 | Van Der Schoot | 53/246 X |
| 3,224,579 | 12/1965 | Scollard et al. | 209/514 |
| 3,224,580 | 12/1965 | Scollard et al. | 209/513 |
| 3,327,848 | 6/1967 | Barnhart et al. | 209/903 X |
| 3,447,176 | 6/1969 | Butterworth et al. | 15/3.11 |
| 3,898,435 | 8/1975 | Pritchard et al. | 235/92 |
| 3,917,069 | 11/1975 | Alexander | 209/74 |
| 3,938,847 | 2/1976 | Peyton | 198/470.1 X |
| 3,948,765 | 4/1976 | Anschutz | 209/513 |
| 4,086,998 | 5/1978 | Van Der Schoot | 198/358 |
| 4,164,291 | 8/1979 | Carlow | 414/136 |
| 4,356,920 | 11/1982 | Van Der Schoot | 209/513 |
| 4,462,201 | 7/1984 | Nambu | 198/470.1 X |
| 4,569,444 | 2/1986 | McEvoy et al. | 209/510 |

FOREIGN PATENT DOCUMENTS 2220317 10/1974 France.
2366889 5/1978 France.
1031334 6/1966 United Kingdom.

Primary Examiner—Robert B. Reeves
Assistant Examiner—Edward M. Wacyra
Attorney, Agent, or Firm—Kenyon & Kenyon

[57] ABSTRACT

An apparatus for transferring eggs continuously conveyed in spaced-apart, aligned relationship by a conveyor to a receiving station at which eggs are packaged according to their individual physical characteristics. A frame on which solenoid-actuated plungers are mounted is disposed adjacent the conveyor at the receiving station for releasing eggs having the same physical characteristics from the conveyor in a predetermined sequence at the receiving station. The frame is movable with respect to the receiving station according to the speed of the conveyor.

2 Claims, 22 Drawing Sheets

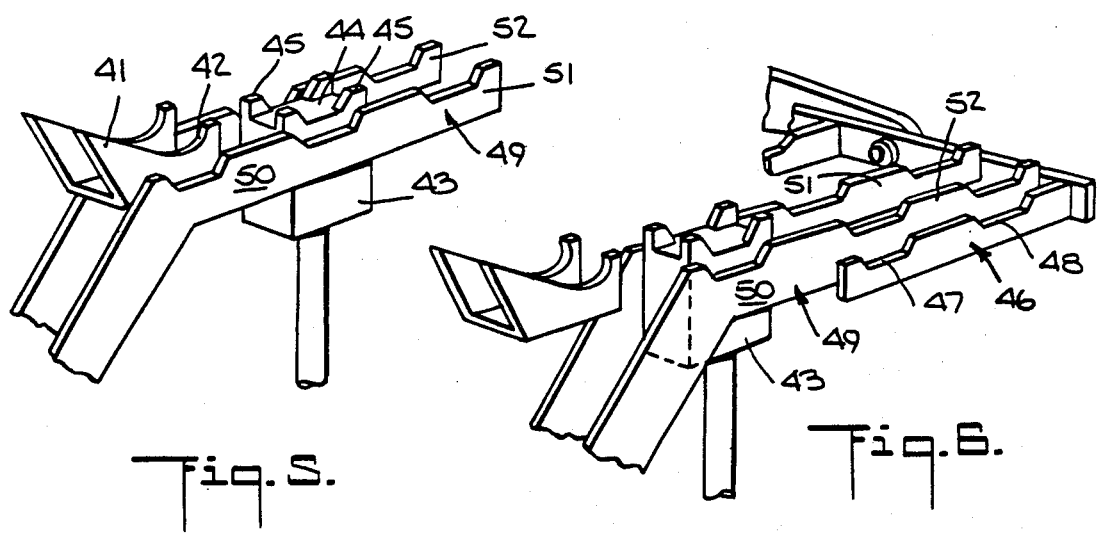
Fig. 5.
Fig. 6.
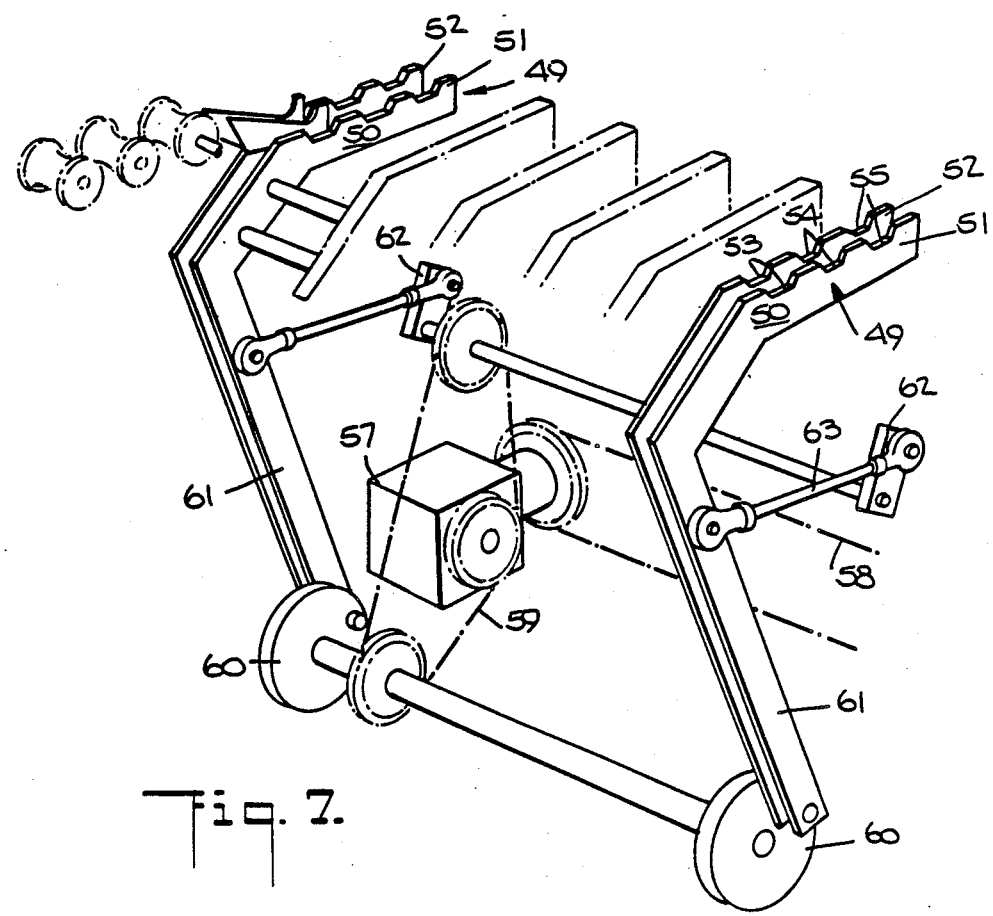
Fig. 7.

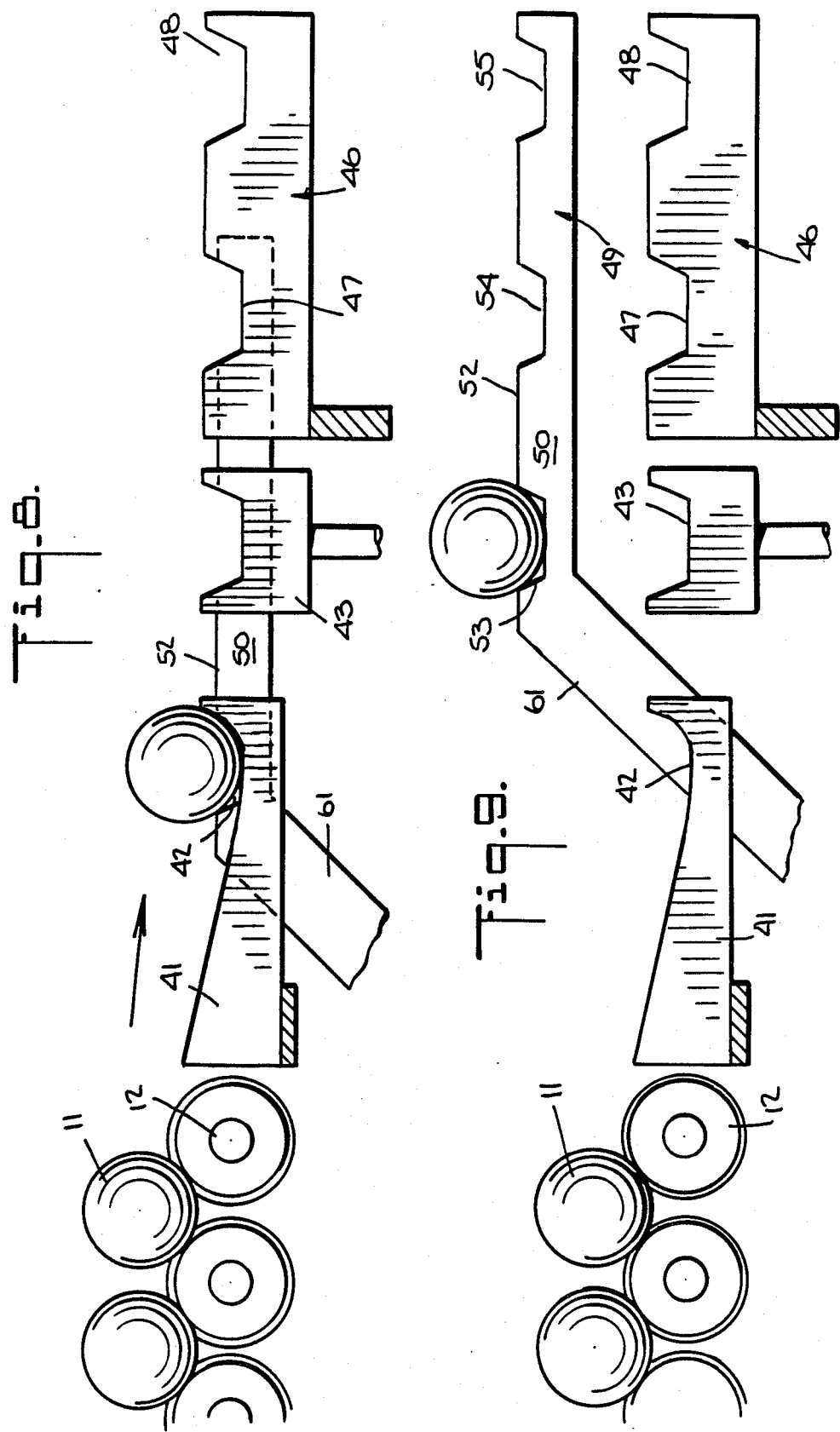

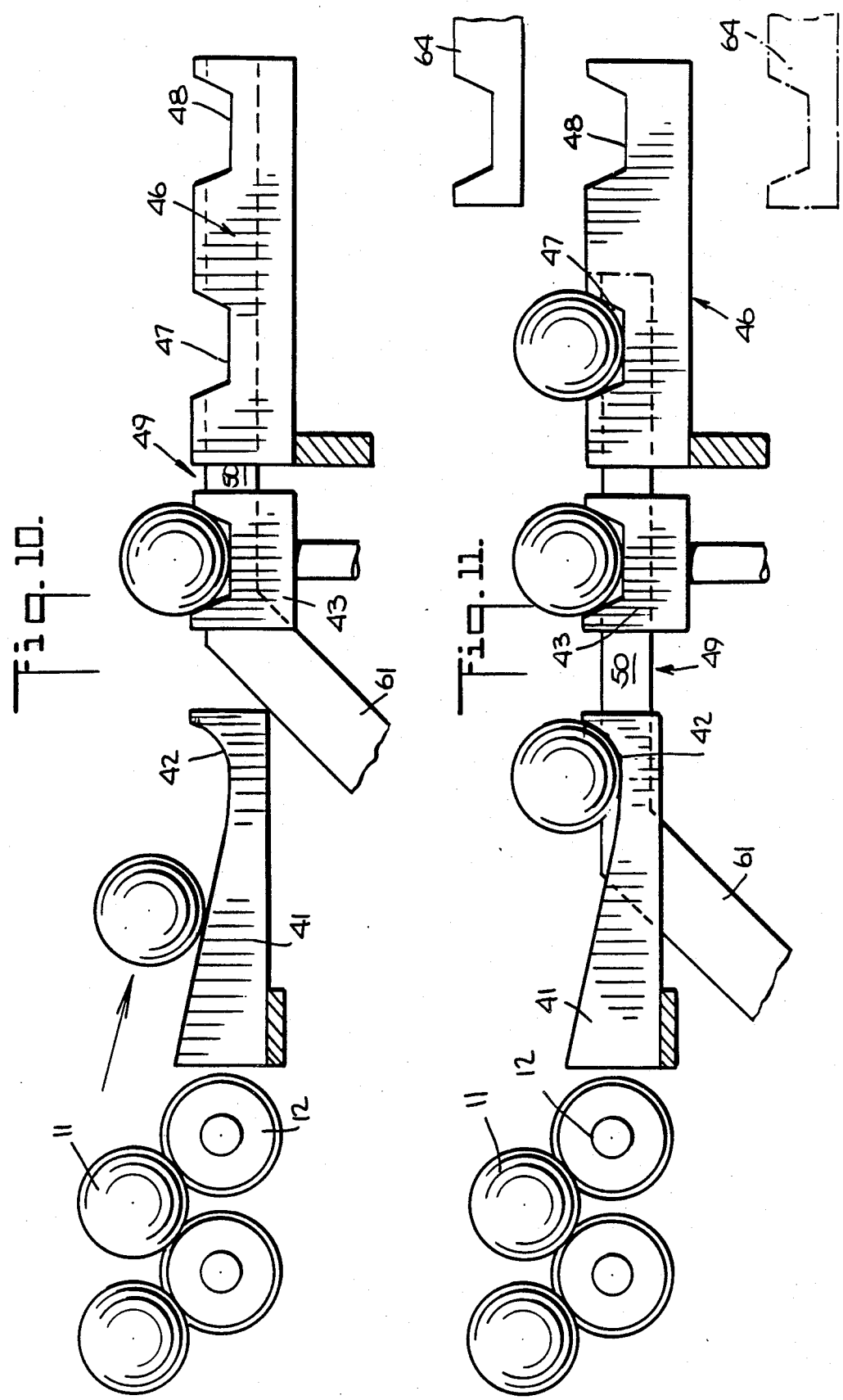

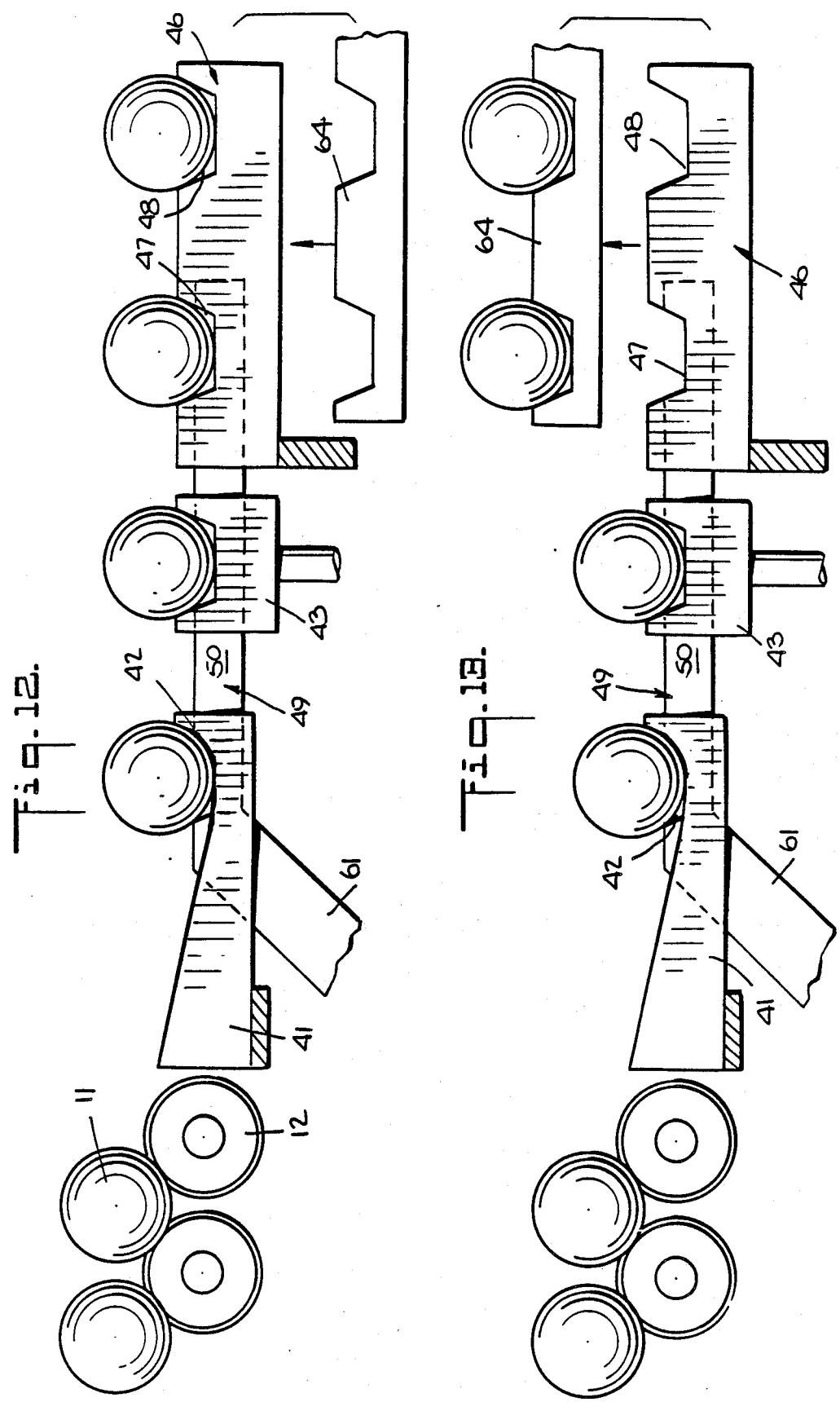

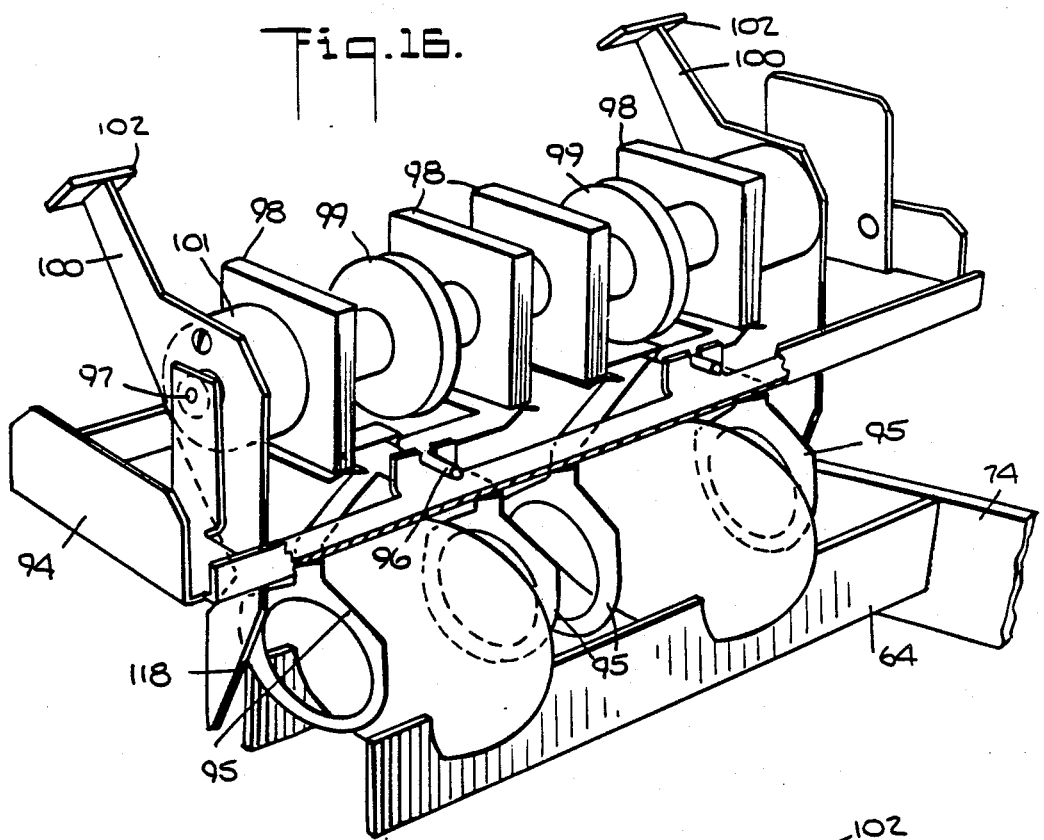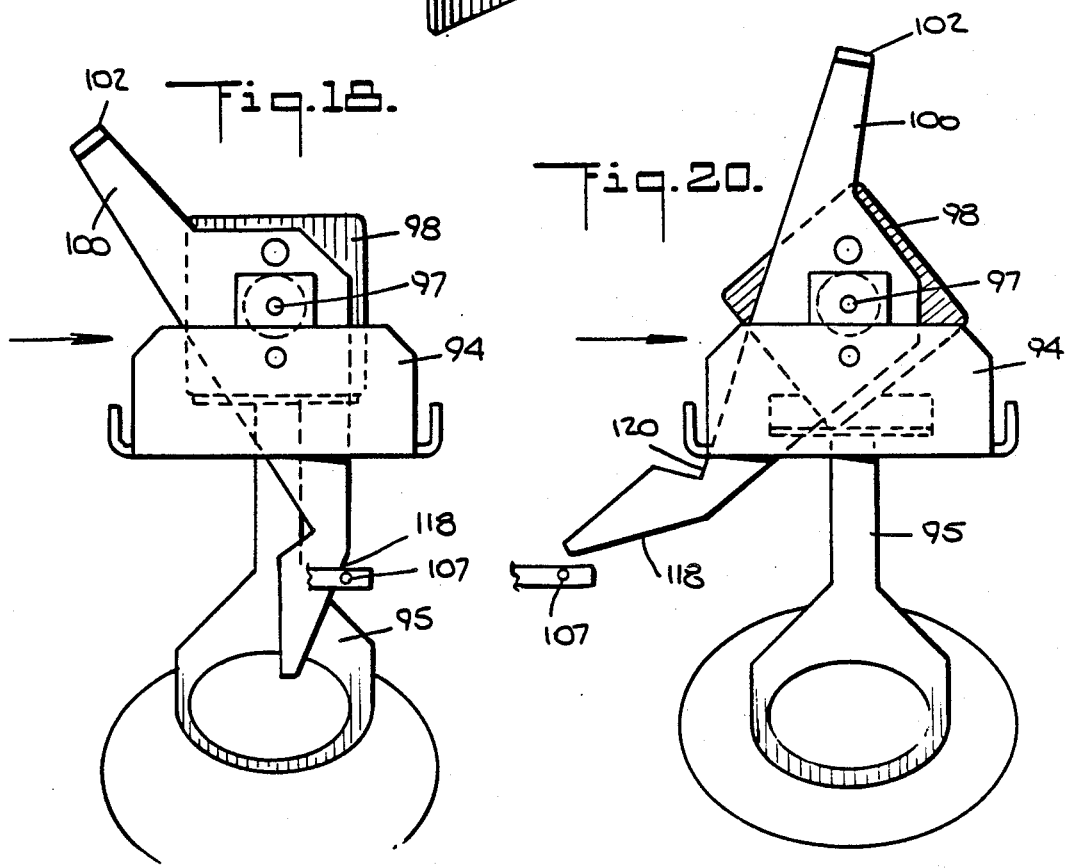

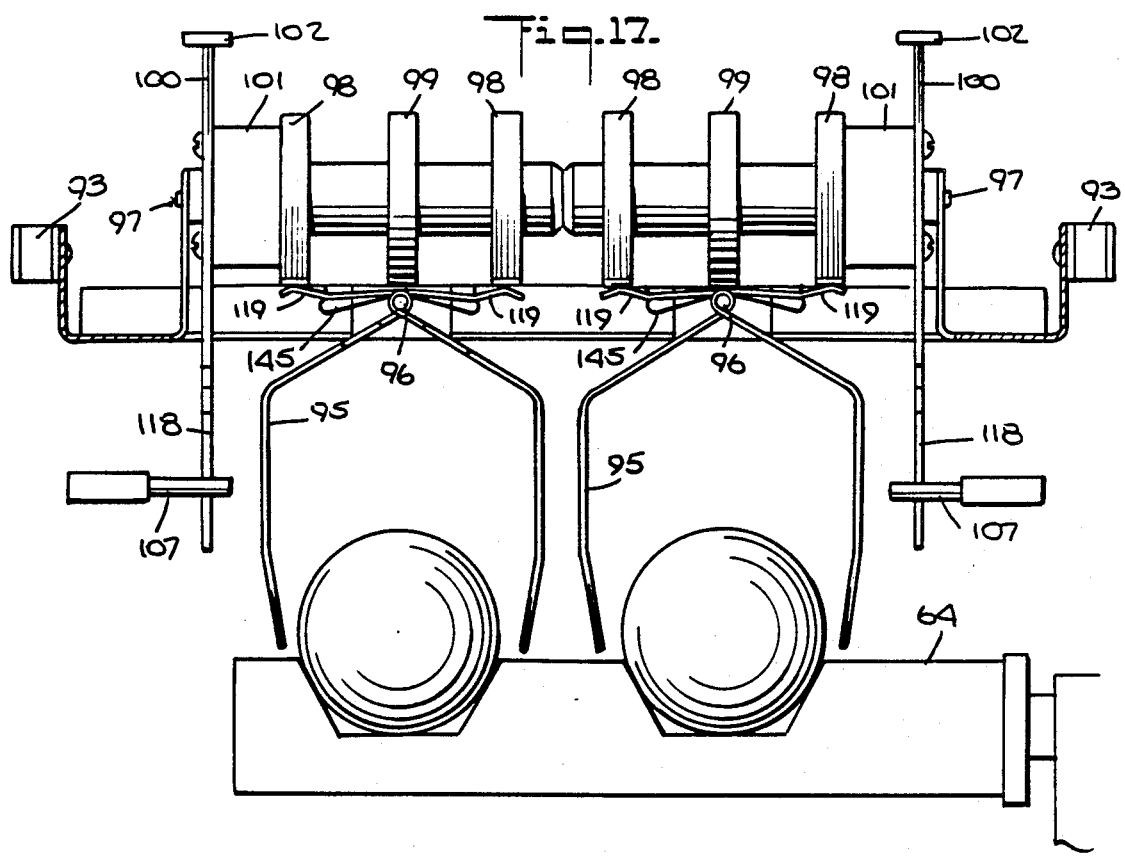
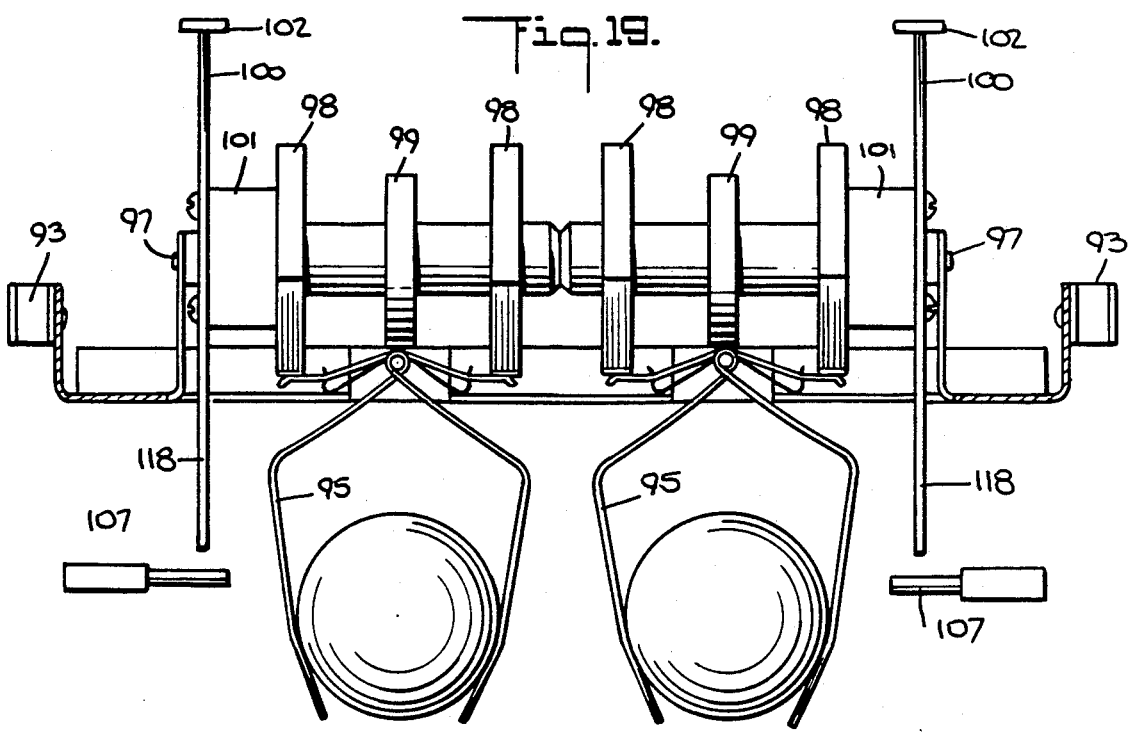

EGG PROCESSING SYSTEM

This is a division of application Ser. No. 394,162 filed July 1, 1982 now U.S. Pat. No. 4,569,444.

BACKGROUND OF THE INVENTION

1. Field of the Invention

This invention relates generally to an egg processing system in which eggs are graded and classified and subsequently separated and packaged at a plurality of receiving stations according to their individual physical characteristics, including weight.

2. Description of the Prior Art

Generally speaking, egg processing systems in which eggs having the same size, weight, etc. are delivered to separate receiving stations for packing into egg cartons according to their individual physical characteristics are known in the art. See, for example, U.S. Pat. Nos. 3,224,580 and 3,255,660. In the processing of eggs, one important component of the processing system is an egg grader by means of which each of the eggs being processed is classified or graded in accordance with its particular physical characteristics, including the weight or size of the egg. Generally, included in the egg grading process is a candling operation by which defects such as blood spots, cracks and the like are identified. In addition, as part of the grading process each egg is weighed in order to determine its size for ultimate packing with other eggs of a generally similar weight and size. In this respect the eggs are weighed in order to facilitate packing in accordance with established weight ranges specified by governmental agencies. Eggs are generally classified into designated classifications, dependent on weight, such as small, medium, large and extra large. In addition, classifications such as peewee and jumbo are utilized for those eggs not falling within the aforementioned weight classifications.

In an egg grader performing the above functions, limitations are placed on the operation of the machine which in turn dictate the maximum operating speed for an entire automated egg processing system. In order to improve the operating efficiency of such systems, increased demands of higher speed are made on the egg grader which in turn requires egg processing systems having a high-speed response time while maintaining accurate separation and packaging of the respective eggs.

SUMMARY OF THE INVENTION

It is therefore an object of the present invention to provide an improved egg processing system which is capable of grading and classifying and subsequently separating and packaging eggs at one or more receiving stations in the apparatus according to their individual physical characteristics at a high speed of operation.

It is also an object of the present invention to provide an improved egg processing system which maintains accurate separation and packaging of eggs having the same physical characteristics as the eggs are processed by the system.

These and other objects of the present invention are achieved in an apparatus for transferring eggs continuously conveyed in spaced-apart, aligned relationship by a first conveyor means to a receiving station at which the eggs are packaged according to their physical characteristics. The apparatus includes means, disposed adjacent to the conveyor means at the receiving station and movable with respect to the receiving station, for releasing eggs having the same physical characteristics from the conveying means in a predetermined sequence at the receiving station. Also included are means, coupled to the releasing means, for varying the position of the releasing means with respect to the receiving station according to the speed of the conveyor means.

The foregoing objects of the present invention are also achieved in a method of transferring eggs delivered to a receiving station of an egg grading apparatus at which the eggs are packaged according to their individual physical characteristics from first conveyor means to the receiving station. The method comprises the steps of continuously conveying the eggs in spaced-apart, aligned relationship to the receiving station on the first conveyor means, and releasing eggs having the same physical characteristics from the first conveyor means in a predetermined sequence at the receiving station, and varying the position with respect to the receiving station at which the eggs are released according to the speed at which the eggs are conveyed to the receiving station by the conveyor means.

These and other novel features and advantages of the present invention will be described in greater detail in the following detailed description.

BRIEF DESCRIPTION OF THE DRAWINGS

FIG. 5 is an enlarged, perspective view of the weighing station of the egg processing system.

FIG. 6 is an enlarged perspective view, similar to that of FIG. 5, illustrating the egg lifting means of the egg transfer system.

FIG. 7 is a perspective view of the egg advancing means drive system of the egg transfer system.

FIG. 8 is an enlarged, elevational view, partially in cross-section, of the egg weighing station depicting an egg being fed from the candler onto a first holding station.

FIG. 9 is an enlarged, elevational view, similar to that of FIG. 8, illustrating an egg being advanced onto the egg weighing station.

FIG. 10 is an enlarged, elevational view, similar to that of FIG. 8, illustrating an egg being deposited on the weighing station and another egg being fed from the candler to the first holding station.

FIG. 11 is an enlarged, elevational view, similar to that of FIG. 8, illustrating an egg being advanced from the weighing station to a second holding station.

FIG. 12 is an enlarged, elevational view, similar to that of FIG. 8, depicting eggs deposited on each of the holding and weighing stations with the lifting means disposed beneath the second holding station.

FIG. 13 is an enlarged elevational view, similar to that of FIG. 12, illustrating the upward lifting of eggs from the second holding station.

FIG. 15 is an elevational view of the egg lifting means and conveyor carriage assemblies of the egg processing system.

FIG. 16 is a perspective view of an egg carriage assembly of the egg processing system of the present invention illustrating the holding members of the assembly in the open position about to engage an egg.

FIG. 17 is a front, elevational view of the egg carriage assembly with the egg-engaging members in the open position.

FIG. 18 is a side elevational view of the egg carriage assembly in the open or egg-releasing position.

FIG. 19 is a front elevational view of the egg carriage assembly with the egg-engaging members in the closed position.

FIG. 20 is a side, elevational view of the egg carriage assembly in the closed or egg-engaging position.

DETAILED DESCRIPTION

Figure 1:
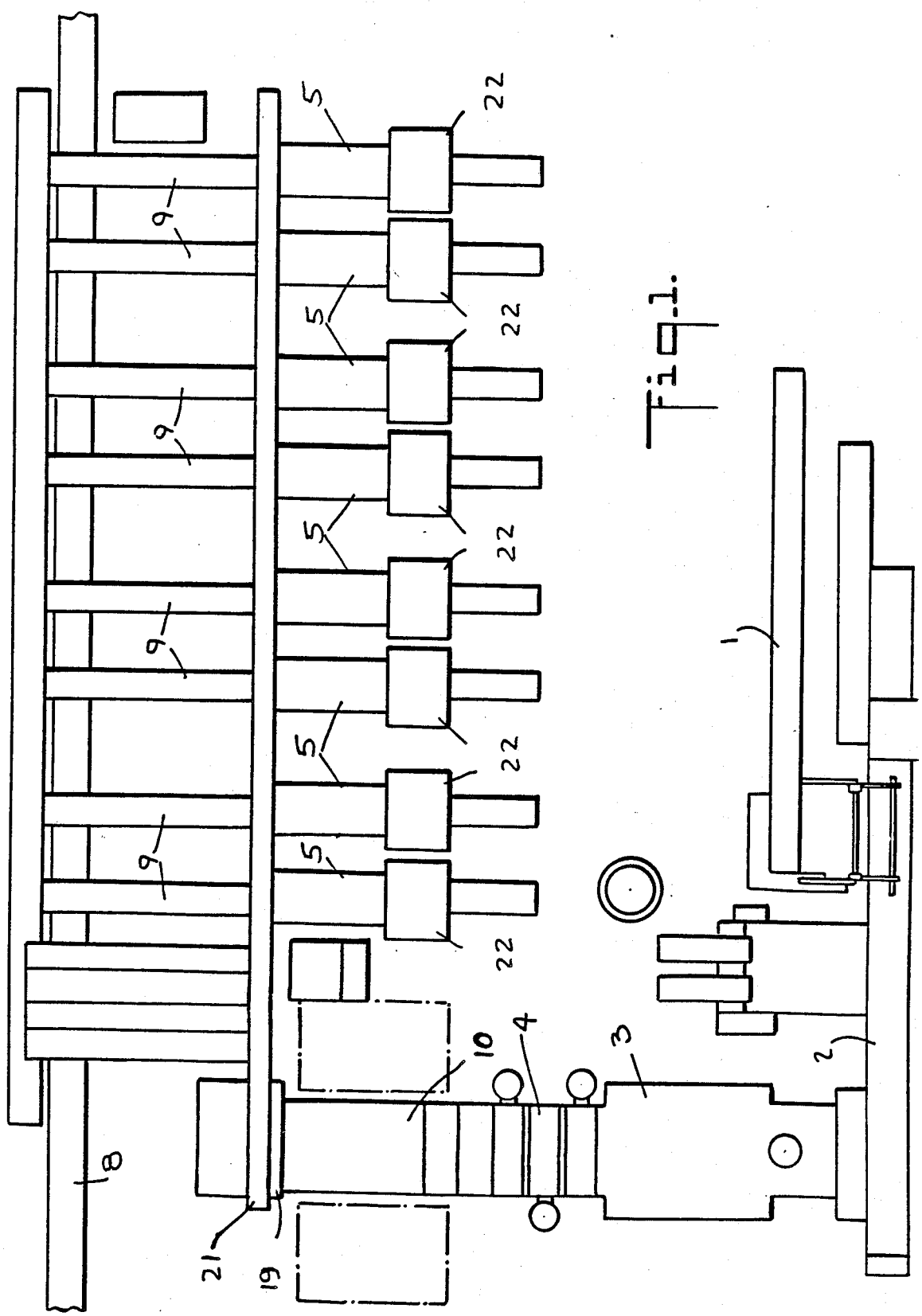
FIG. 1 is a top plan view of one embodiment of an improved egg processing system constructed according to the present invention.

Referring now to the drawings, and in particular to FIG. 1, there is shown an egg processing system including an incoming conveyor 1 and a preloader 2 by which a mass of eggs to be processed are loaded. The eggs are conveyed from the preloader on a conveyor 3 to an egg washer 4 in which the eggs are washed. The egg washer is disposed adjacent a candler 10 to which the eggs are conveyed and in which defects are visually detected by an operator who stands on a platform on either side of the candler. The eggs are conveyed through candler 10 by means of a movable spool bar conveyor 12 (see FIG. 2) to an egg weighing station 19 at which the eggs are individually weighed. After weighing, the eggs are conveyed in spaced-apart, adjacent pairs by means of a conveyor 21 to a plurality of egg packers 22 at which eggs which have been graded and classified are separated according to their individual physical characteristics. Cartons into which the eggs are packed are conveyed to each of the packers by means of conveyors 8 and 9 which extend beneath conveyor 21 and individual egg conveyors 5 which lead to each of packers 22.

Figure 2:
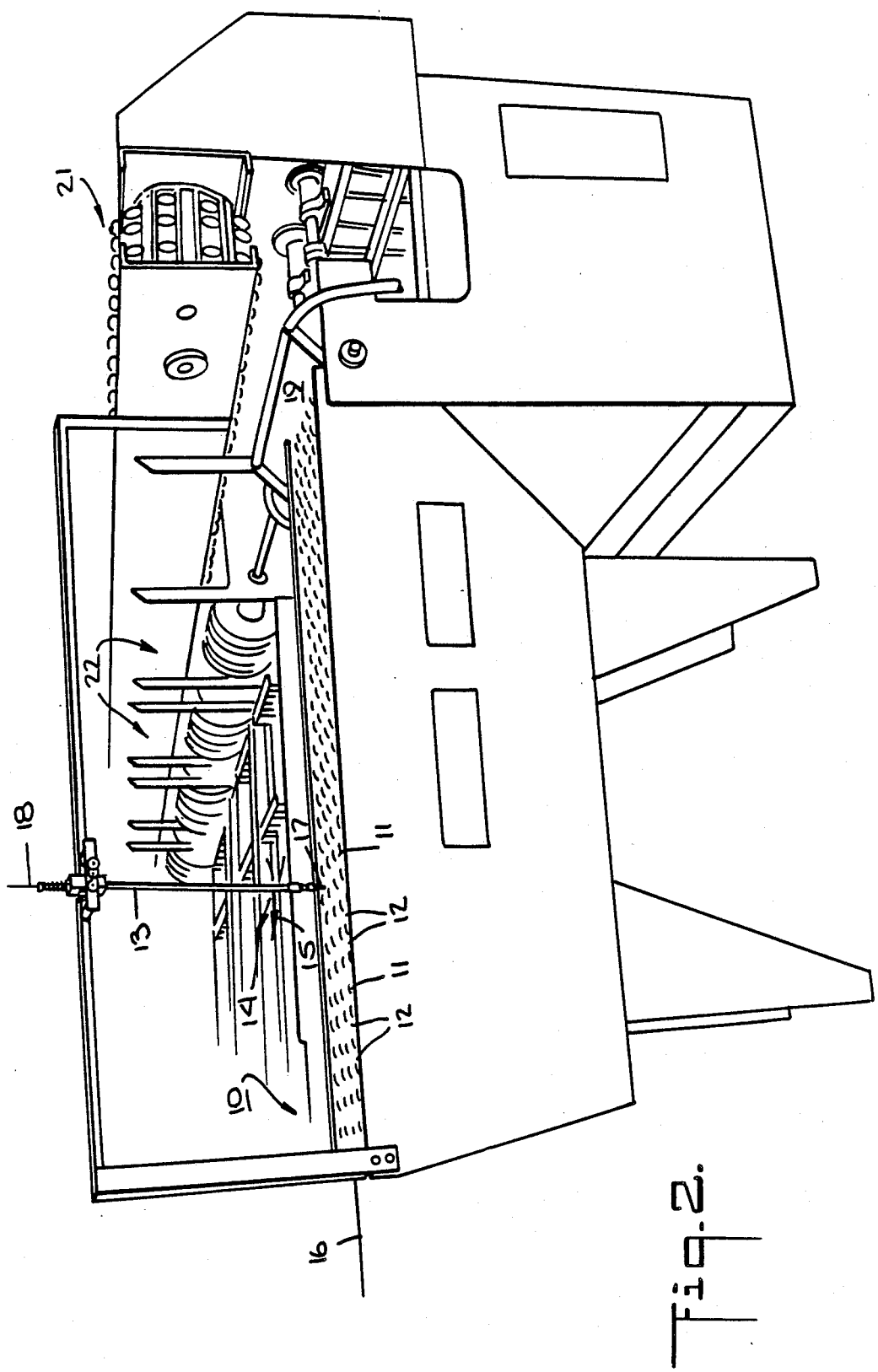
FIG. 2 is a perspective view of the egg processing system illustrated in FIG. 1.
Figure 3:
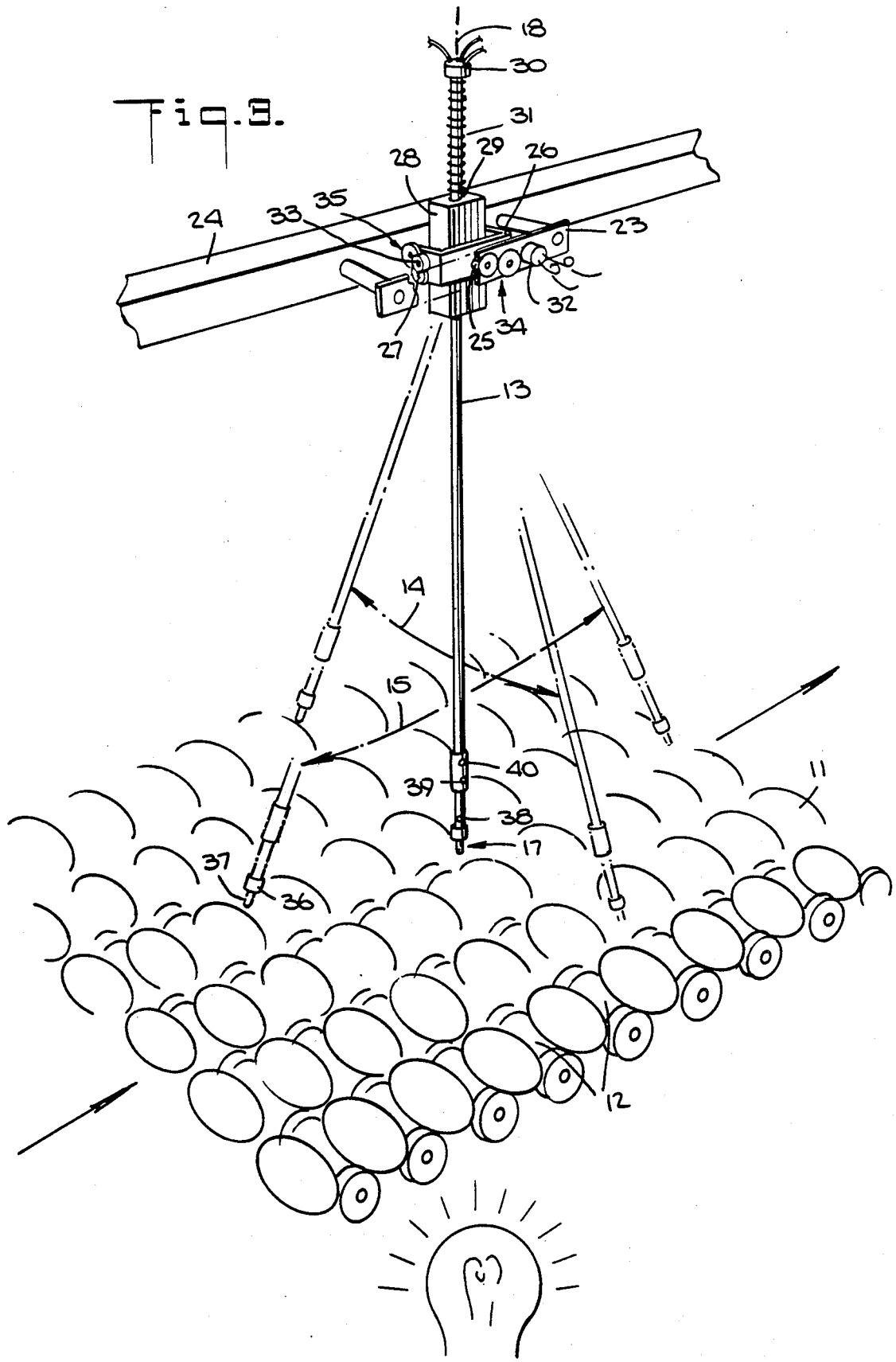
FIG. 3 is a partial, perspective view of the egg candler of the egg processing system of the present invention.
Figure 4:
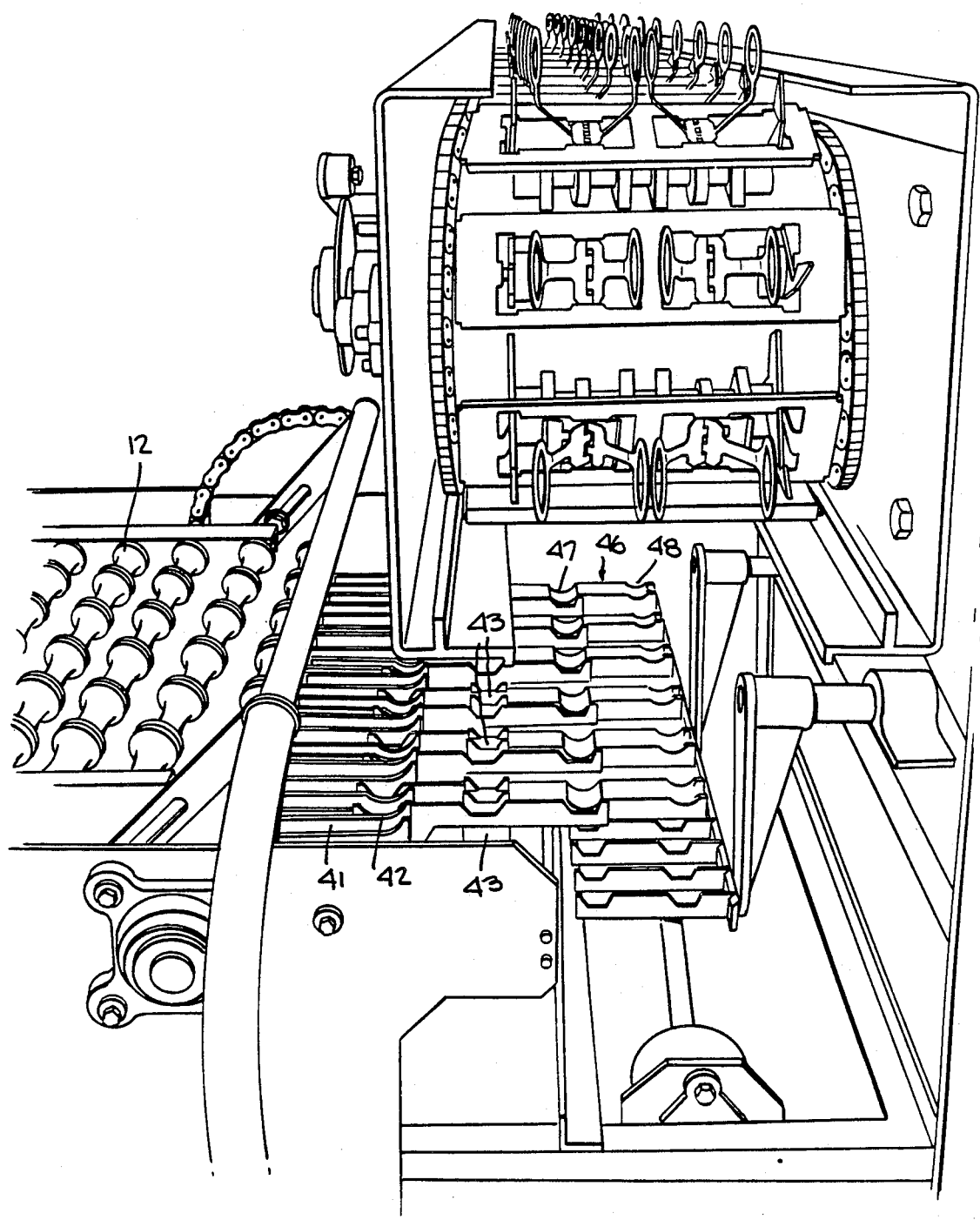
FIG. 4 is a partial perspective end view of the egg processing system of the present invention showing the candler, weighing stations, egg transfer system, and egg conveyor.

Referring now to FIGS. 2 and 3, the egg candler of the egg processing system is generally identified by reference numeral 10. In the candler, a mass of eggs 11, including randomly dispersed eggs having defects such as blood spots, dirt stains, rough spots, shell cracks and the like, are continuously conveyed by a spool bar conveyor including a plurality of spool bars 12 over a high-intensity light source to enable the visual detection of such defects by an operator standing adjacent to the conveyor. The movable spool bars 12, which comprise a plurality of concave cylinders rotatably mounted on spaced-apart, parallel spools driven at their ends in conveyor-fashion by parallel chain drives, and between which the eggs are disposed, continuously convey eggs 11 through candler 10 is spaced-apart, aligned relationship, i.e., in aligned columns and rows over the high-intensity light source. In the illustrated embodiment of the invention, the eggs are aligned in six parallel longitudinal columns on the spool bars for passage through the candler and over the high-intensity light source to enable visual detection of defects. It should be noted that although only one six-column spool bar conveyor has been illustrated, two such conveyors may be disposed adjacent one another to provide a twelve column conveyor for conveying the eggs through the candler.

An elongated movable pointer or rod 13 is disposed vertically above spool bars 12 and is pivotably mounted at its upper end so as to be movable over a selected area or plane of the candler above the spool bars 12 in mutually orthogonal directions (indicated by arrows 14 and 15), approximately parallel to the longitudinal axis 16 of the spool bar conveyor and perpendicular to longitudinal axis 16, i.e., in directions approximately parallel to the columns and rows of eggs 11 on spool bars 12. The vertical lower end 17 of pointer 13 is disposed adjacent spool bars 12 and is axially movable along its longitudinal axis 18 so that lower end 17 is movable into and out of engagement with the shells of eggs disposed in the plurality of locations within the selected area of the candling system on spool bars 12 over which pointer 13 is movable. The eggs, including defective eggs identified by the operator, are conveyed through the candler to an egg weighing station 19 (see FIG. 1) which includes the scales for weighing the eggs, and then are transferred by means of an egg transfer system (described later herein) to an egg conveyor 21 which conveys the eggs in adjacent pairs to a plurality of egg packing stations 22 where the eggs are separated and packaged in cartons according to their weight and the type of defect detected, if any.

Pointer 13 is pivotably mounted in a frame 23 which is mounted on a longitudinal support beam 24 over the spool bars 12 (FIG. 3). The frame 23, which may be either stationary or movable, includes a first axle 25 rotatably mounted in frame 23 and disposed in a direction perpendicular to the longitudinal axis of the spool bar conveyor. Another frame 26 is rigidly mounted on axle 25 so as to be pivotable about the longitudinal axis thereof and includes a second axle 27, which is coupled to pointer 13 by means of a rectangular-shaped frame member 28 rigidly mounted on axle 27. Axle 27 is rotatably mounted in frame 26 in a direction parallel to the longitudinal axis of the spool bar conveyor. Frame member 28 includes an aperture 29 having a diameter slightly greater than that of pointer 13 through which pointer 13 passes. The pointer has a flange 30 disposed at its vertically uppermost end which engages one end of a coil spring 31 disposed over the pointer between flange 30 and frame 28 for movably supporting rod 13 in frame 28, and in frames 23 and 26. This arrangement permits the movement of pointer 13 in the mutually orthogonal directions 14 and 15 parallel and transversely with respect to the longitudinal axis of the spool bar conveyor, as well as longitudinally along axis 18 of pointer 13 into and out of engagement with eggs 11 on spool bars 12.

Pointer 13 includes means for generating at least one signal for indicating the position of eggs 11 having a defect on spool bars 12 when the shells of the eggs are engaged by pointer 13. In the illustrated embodiment of the invention, this signal generating means comprises potentiometers 32 and 33 coupled by a plurality of intermeshing gear wheels 34 and 35 to axles 25 and 27 mounted in frames 23 and 26. Potentiometer 32 is rigidly mounted on frame 23, and potentiometer 33 is rigidly mounted on frame 26, along with gear wheels 34 and 35, respectively. The signal generating means further comprises a switch, generally identified by reference numeral 36, disposed in the vertically lower end 17 of pointer 13. The switch comprises a cylinder slidably disposed within the lower end of the pointer having an elongated portion 37 extending from an aperture provided in the lower end of the pointer for engaging the shells of the eggs disposed on spool bars 12. An air pressure supply source and pneumatic switch (not shown) are coupled to the interior of pointer 13. The pneumatic switch is also electrically coupled to potentiometers 32 and 33. Another aperture 38 is disposed at the vertical lower end of pointer 13 in the side wall thereof adjacent the cylinder of switch 36 so that when the cylinder is disposed in its lowermost position in pointer 13 and elongated portion 37 extends from the lower end of the pointer, aperture 38 is uncovered and the pressurized air supply to the interior of the pointer is permitted to escape. When portion 37 of switch 36 engages an egg and the cylinder is pushed upwardly within pointer 13, aperture 38 is covered by the cylinder and the air is not permitted to escape, thus increasing air pressure within the pointer and activating the pneumatic switch.

The signal generating means also comprises means for generating a second signal approximately simultaneously with generation of the first signal for identifying the type of defect detected in the eggs engaged by pointer 13. This signal generating means comprises manually-operable pneumatic switches (not shown) which are coupled at one end to a pressurized air supply source and at the other end directly by tubular conduits extending through the interior of the pointer to two additional apertures 39 and 40 disposed in the lower end of pointer 13. These apertures are disposed directly above aperture 38 and are manually closable by placing a finger over the apertures.

In operation, eggs 11 are continuously conveyed on spool bars 12 beneath rod 13 over the light source of candler 10 and are visually inspected by an operator for defects. If defective eggs are detected by the operator, pointer 13 is first pivoted to a position over each defective egg and then is moved downwardly, along the longitudinal axis of the pointer, toward the defective egg until the egg is engaged by extended portion 37 of switch 36. At the same time, the operator places a finger over one or both of apertures 39 and 40, or alternatively, leaves both of the apertures open.

When pointer 13 is moved downwardly and portion 37 engages a defective egg, aperture 38 is closed and the air under pressure entering pointer 13 is no longer permitted to escape. This causes activation of the pneumatically-actuated switch coupled to the interior of the pointer, and generation of signals representing the position of the end of pointer 13 and thus the location of the defective egg on spool bars 12. At the same time, when either one, both, or neither one of apertures 39 and 40 are closed by the operator, the pneumatic switches coupled to these apertures are either individually or simultaneously activated, or are not activated, thereby generating additional signals, or not generating signals, to identify the type of defect detected by the operator. Since pointer 13 is mounted by means of spring 31 on frame 28, after the operator engages a defective egg, the pointer retracts to a position away from the eggs on spool bars 12 to a position in which it is ready to be used to identify the location of another defective egg.

Further details of the construction and operation of the foregoing candler are contained in copending application Ser. No. 394,444, filed July 1, 1982, entitled "Article Coding and Separating System".

Referring now to FIGS. 4 through 7, the inspected eggs are conveyed through the candler 10 by rotating spool bars 12 and fed onto a first holding station or bar 41. Holding bar 41 is in the form of a U-shaped channel having a recessed section 42 at which the egg, after passing through candler 10, is positioned. The egg is fed from candler 10 by the rotating spools and is gravity fed along the inclined surface of holding bar 41 into the recessed egg receiving section 42. A series of six holding bars 41 are disposed adjacent one another, such that six eggs may be fed simultaneously from the six columns of eggs on the spool bar conveyor of candler 10 to a plurality of weighing stations 43 disposed adjacent the end of the receiving sections 42. After weighing, the eggs are transfered to the egg conveyor from the weighing stations by the simultaneous transfer of six pairs of eggs as is described later herein. Of course, other multiples of bars may be provided in accordance with the invention, e.g., twelve bars to transfer twenty-four eggs from the weighing stations to the egg conveyor if two six-column conveyors are used in the candler.

Located downstream of holding bar 41 is the weighing station 43. Each weighing station 43 has a contoured upper section having a recess 44 adapted to hold an egg and formed between the upwardly protruding prongs 45. Weighing station 43 includes a scale which is movable in a vertical direction and serves to determine accurately the weight of each egg as it is positioned thereon. The weight of each egg as determined at weighing station 43 is represented by an electrical signal generated by the scale and which is then, for example, stored in a memory device, such as a random access memory, associated with a central processor unit. Downstream of weighing station 43 is a pick-up station 46 which has provision for holding two eggs in a pair of recesses 47 and 48.

The eggs are advanced from candler 10 to the pick-up station 46 by means of the drive system illustrated in FIG. 7. An egg advancing means, illustrated as a bar 49, includes an upper horizontal section 50 formed by spaced-apart side members 51 and 52 each of which has three recesses 53, 54 and 55 for holding individual eggs. A main drive motor drives a shaft 56 (see FIG. 14)

which in turn is connected to the right angle gear box 57 by drive chain 58, the output gear box 57 driving chain member 59. A pair of oppositely disposed crank members 60 are rotationally driven by chain 59 and pivotally connected to the downwardly depending arm 61 of the egg-advancing means 49. Another pair of oppositely disposed crank members 62 are similarly driven by chain 59 and pivotally connected by way of linkage 63 to the downwardly depending arm 61 of the egg-advancing bar 49. In this manner, the upper horizontal section 50 is driven in an elliptical or oval path such that the portion of the path between the holding station 41, weighing station 43 and pick-up station 46 is along the major axis of the elliptical path.

With particular reference to FIGS. 8 through 13, the advancement of an egg from holding station 41 to pick-up station 46 is described. Eggs 11 are conveyed through candler 10 by means of the spool bars 12. As the egg is rolled from the candler 10 by the last spool bar 12, it is rolled down the inclined portion of holding station 41 into the recessed egg-receiving recessed section 42. Advancing bar 49, and in particular recess 53 therein, engages the egg from the underside thereof and lifts the egg upwardly into the position depicted in FIG. 9. As advancing bar 49 is lowered along its elliptical path, the egg is moved from the recess 42 onto the scale at weighing station 43 as illustrated in FIG. 10. A second egg is then rolled down the inclined portion of holding station 41 into recessed section 42. By a similar movement of the advancing bar 49 along its elliptical path, the egg is lifted from the weighing station 43 and advanced to recess 47 at pick-up station 46 (FIG. 11). Subsequently, the egg is advanced again by advancing bar 49 into recess 48 of pick-up station 46 (FIG. 12). Once two eggs are in position at pick-up station 46, each of the eggs in recesses 47 and 48 is lifted upwardly by a lifting arm 64 which move both rotationally with respect to pick-up station 46 as well as in a direction longitudinally with respect thereto (FIG. 13). The longitudinal movement of the lifting arm 64 with respect to pick-up station 46 serves to move the lifted eggs away from pick-up station 46 as the advancing means 49 is moving a subsequent egg into the recesses 47 and 48.

Figure 14:
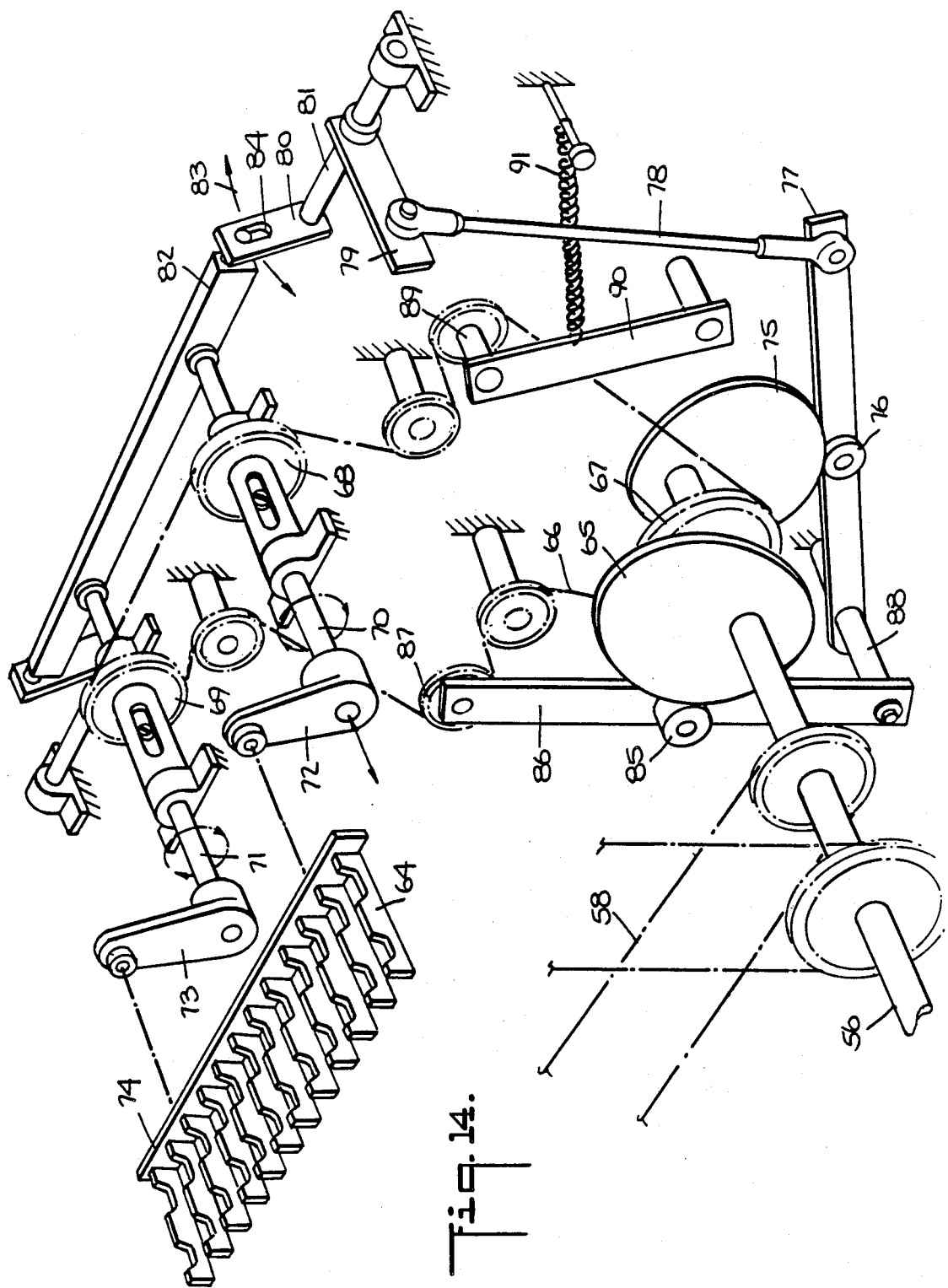
FIG. 14 is a perspective view of the lifting means drive system of the egg transfer system.
Figure 1S:
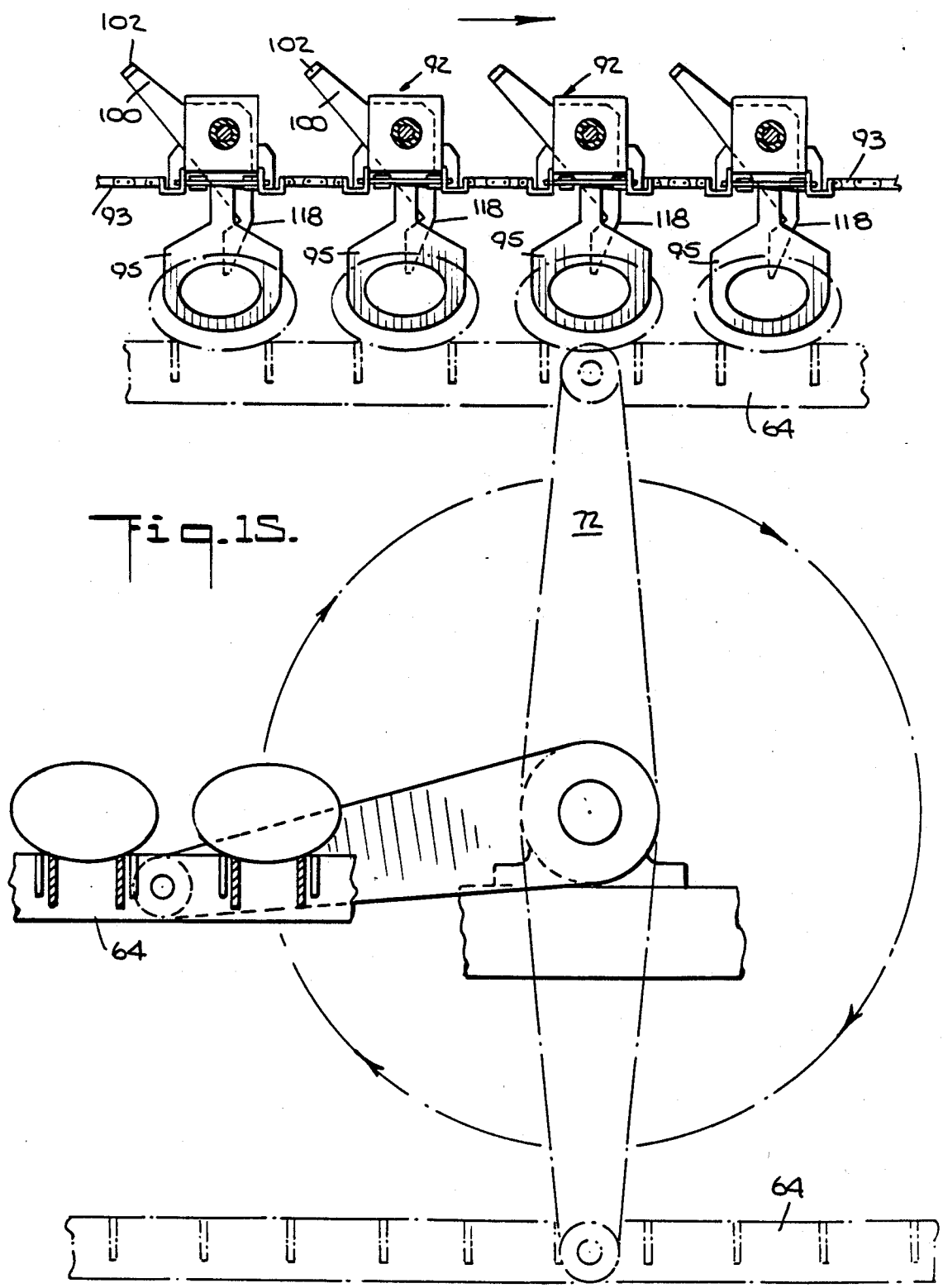

With reference particularly to FIG. 14, the drive system for lifting arm 64 is illustrated. A main drive motor is coupled to drive shaft 56 which has mounted thereon a differential speed cam 65 and sprocket-driven chains 58 and 66. Chain 58, as previously explained, provides the drive for advancing bar 49 (FIG. 7). Chain 66, which is driven by sprocket 67, in turn serves to drive a pair of differential speed-drive sprockets 68 and 69. Each of the sprockets 68 and 69 drives the respective shafts 70 and 71 in a counter-clockwise direction, the shafts having mounted on the ends thereof crank arms 72 and 73, respectively. Each rotary crank arm 72 and 73 is fastened to an elongated support bar 74 on which twelve (12) individual lifting plates, which form lifting arm 64, are mounted, each adjacently spaced pair of lifting plates serving to lift an egg. Support bar 74 thus facilitates the simultaneous lifting of two rows of six side-by-side eggs. In other words, the adjacently spaced lifting plates serve to lift simultaneously twelve (12) eggs from the six pick-up stations 46 provided in the egg grader and transfer the eggs in adjacent pairs to the egg conveyor.

A cam 75 is mounted at the end of main drive shaft 56 and is engaged by a cam follower 76 mounted on a pivotable arm 77 which in turn is connected at the end thereof to a connecting linkage 78. Linkage 78 is pivotally connected to a right-angle drive arm 79 which in turn drives a coupling bar 80 with an oscillating motion about a shaft 81. A drive bar 82 is reciprocally driven in a direction toward and away from pick-up stations 46 by means of coupling bar 80 which is connected thereto via a pin 83 slidably mounted in a slot 84.

Cam 65 is in rotational engagement with a cam follower 85 mounted on an arm 86 which has mounted at its upper end an idler 87 and at its lower end is pivotally connected by a shaft 88 to pivotable arm 77. Chain 66 is further routed over idler sprocket 89 which in turn is mounted to an idler arm 90 fastened to a spring 91. In this manner, the spring loaded idler arm 90 serves to maintain tension in the drive chain 66 while support bar 74 is driven both rotationally and longitudinally with respect to pick-up stations 46. Further, differential speed cam 65 serves to regulate the rotational drive speed of lifting arm 64 such that when the plates of the arm arrive at the pick-up stations 46 (when the eggs are being removed therefrom), the rotational speed of the lifting arm is decreased to facilitate the smooth upward lifting of the egg from the pick-up stations.

In this latter connection, reference is made to FIG. 15 in which the rotational movement of the crank arm 72 and lifting arm 64 is illustrated. As illustrated, the plates of lifting arm 64 engage the eggs from the underside thereof at pick-up stations 46, which are positioned in the rotational path of arm 64 at approximately the nine o'clock position. Arm 64 is then rotated clockwise while also being moved longitudinally away from pick-up stations 46. At the twelve o'clock position each of the eggs is brought within the depending arms of carriage assemblies 92 which are part of the egg conveyor and are driven by a chain 93. At this position, both the eggs and carriage assembly should be travelling at the same speed to properly effect transfer.

Referring now to FIGS. 16–20, each carriage assembly 92 includes a sheet metal platform 94 which has mounted thereon a pair of depending prongs or egg-engaging members 95. Prongs 95 are pivotally mounted and positioned opposite one another in order to engage an egg therebetween across its smaller side or width. The lower portion of each prong 95 is curved so as to approximate the curvature across the smaller width of the egg, and the upper portion of each prong is reversely bent so as to provide a surface having a generally horizontal orientation. The reversely-bent portion of each prong is mounted on a fixed shaft 96 so as to be pivotally movable with respect thereto. The prongs are mounted over shaft 96 with the reversely bent portions thereof disposed in opposing relationship.

A mounting shaft 97 is positioned on the platform 94 generally perpendicular with respect to the fixed shafts 96. Cam members 98 have a generally square profile and are pivotally mounted on shaft 97 with the operative bottom flat surface being in engagement with the horizontal surface of reversely-bent portions of egg-engaging prongs 95. An integral spacer 99 is disposed between adjacent cam members 98 in order to maintain the proper spacing and engagement of the horizontal cam-engaging surface with the horizontal surface of egg-engaging prongs 95.

Coupled to each end of cam members 98 is an extension bar 100 which is spaced from the end cam member 98 by integral spacer 101. Bar 100 is provided with an upper T-shaped portion 102 which is engageable with the latch pins of a comb assembly and solenoid-actuated plungers described later herein, in order to cause rotational movement thereof. Each bar 100 is fastened or directly coupled to the adjacent spacer 101, cam 98, intermediate spacer 99 and the adjacent cam 98. In this manner, each pair of egg-engaging prongs 95 is operable independently of the others although mounted to a common shaft 97.

Figure 21:
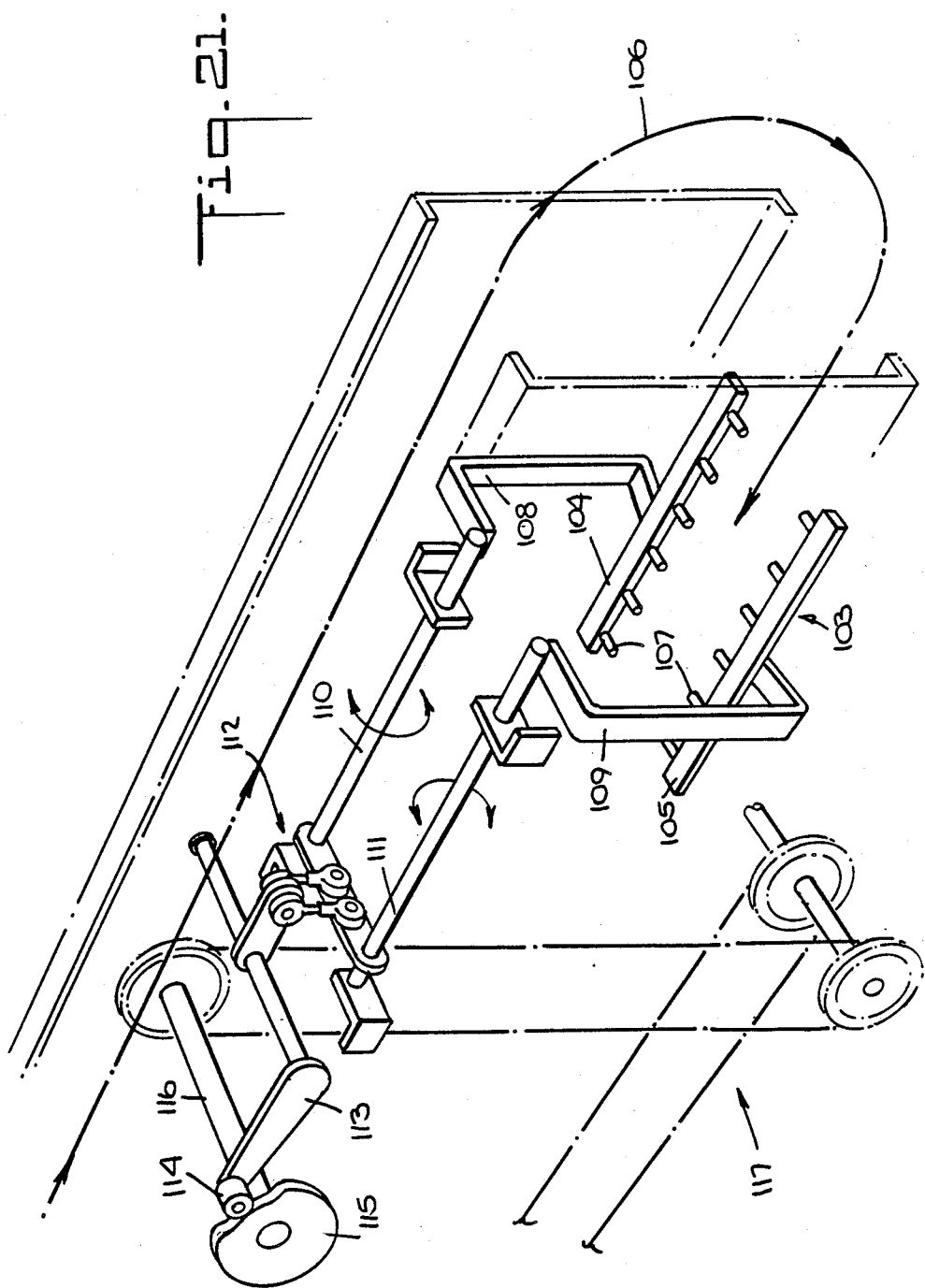
FIG. 21 is a perspective view of a comb assembly for engaging the prongs of the carriage assemblies of the egg conveyor.

Lifting arm 64 rotates about an axis offset from the line formed between holding stations 41, weighing stations 43 and pick-up stations 46 so that each pair of eggs disposed at pick-up stations 46 is engaged from the underside thereof when the lifting arm 64 reaches approximately a nine o'clock position (looking from the rear of the machine). As arm 64 is moved upwardly from pick-up stations 46, reciprocating drive bar 82 moves the lifting arm assembly away from stations 46 so as to avoid any collision between the eggs being removed from the pick-up stations and the eggs being advanced thereto. Once the eggs are in a position coincident with the approximate center of prongs 95 (approximately the twelve o'clock position), a comb assembly 103 (FIG. 21) is positioned in the path of the lower surface 118 of the extension bars 100. Each carriage assembly 92 arrives at comb assembly 103 with bar 100 in the position depicted in FIG. 18, i.e., in its open position ready to receive the eggs.

Comb assembly 103 consists of two elongated bar members 104 and 105 disposed adjacent the travel path 106 of the carriage assemblies on the egg conveyor and on which a plurality of inwardly directed latch pins 107 are disposed. The bar members are mounted on a pair of U-shaped, downwardly-extending support members 108 and 109 which are in turn connected to a pair of rotatable rods 110 and 111. The rods are connected by means of a linkage 112 to a crank arm 113 and a cam follower 114 mounted at the end of the crank arm which engages a cam 115 mounted on a shaft 116 driven by a chain and sprocket drive assembly 117 which is connected to shaft 56 coupled to the main drive motor. The comb assembly includes twelve latch pins 107 for engaging the lower surface 118 of twelve extension bars 100 of the carriage assemblies for closing twelve pairs of prongs on twelve eggs simultaneously during operation of the conveyor.

In operation, egg-engaging prongs 95 are in an open position when passed adjacent the path of the rotating lifting arm 64. In this manner, each carriage assembly 92 arrives at the comb assembly with bars 100 in the position depicted in FIG. 18. When the eggs are in a position coincident with the approximate center of prongs 95, the latch pins of the comb assembly 103 are positioned in the path of extension bars 100. Comb assembly 103 closes or latches prongs 95 on twelve eggs simultaneously. Each prong of comb assembly 103 engages a lower surface 118 of extension bars 100 (FIG. 18) causing the same to rotate in a clockwise direction while rotating cam members 98 therewith. Cams 98 are rotated approximately 45° such that the angular or corner portion thereof downwardly depresses a horizontal surface 119 of the egg-engaging prongs 95 (FIG. 17). The downward movement of the generally horizontal cam-engaging surface causes the lower egg-engaging portion of prongs 95 to move inward with respect to one another and close in an engaging relationship with the egg. In this manner, the egg is lifted from lifting arm 64 by the prongs and conveyed to the receiving stations downstream in the machine. When bars 100 are pivotally moved into the closed position illustrated in FIG. 20, the lower portions 120 thereof engage platform 94 which in turn limits the rotational movement thereof.

Further details of the construction and operation of the foregoing portion of the egg processing system are contained in copending application Ser. Nos. 394,443 and 394,430, filed July 1, 1982.

Figure 22:
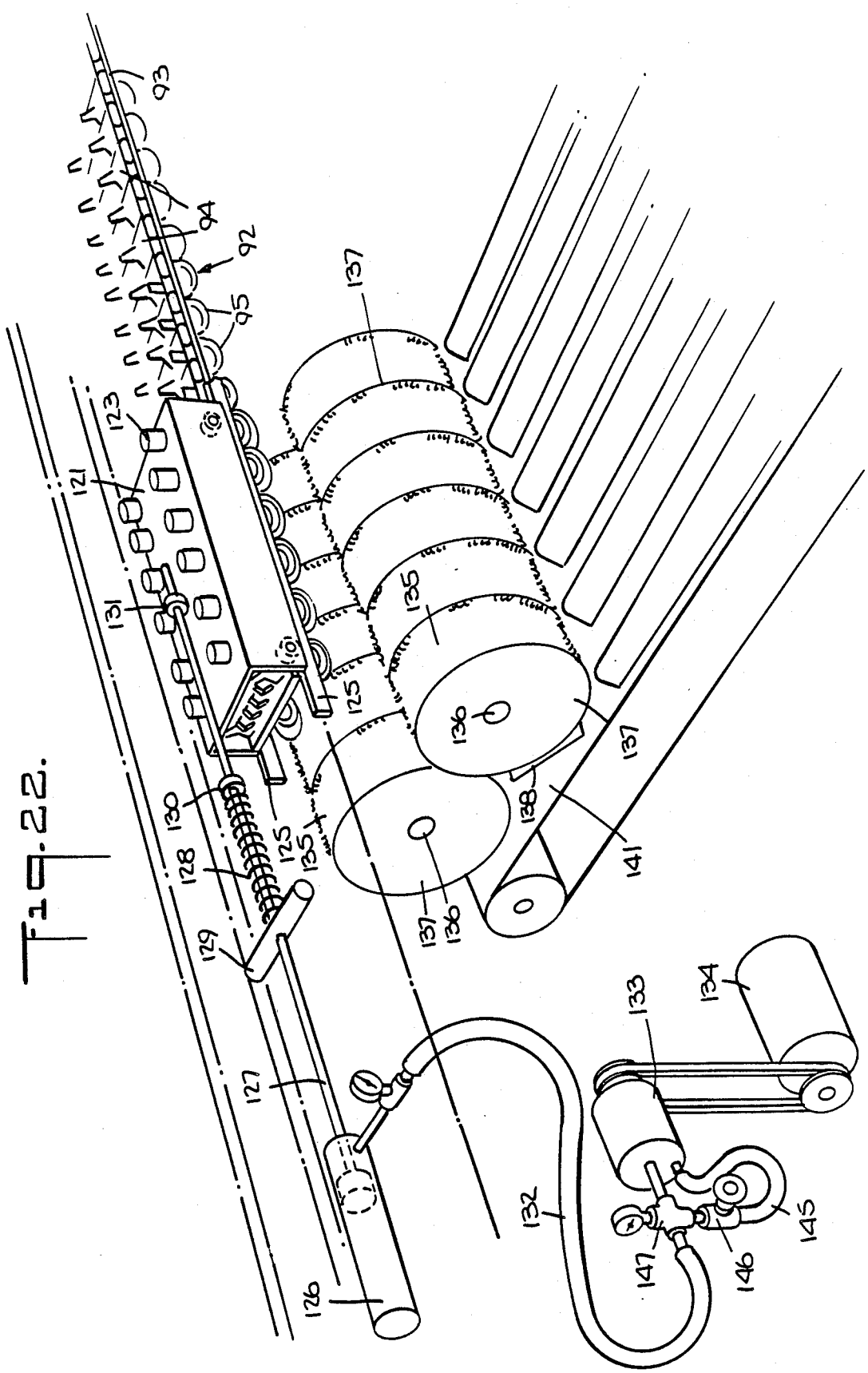
FIG. 22 is a perspective view of one embodiment of a receiving station of the egg processing system of the present invention.
Figure 23:
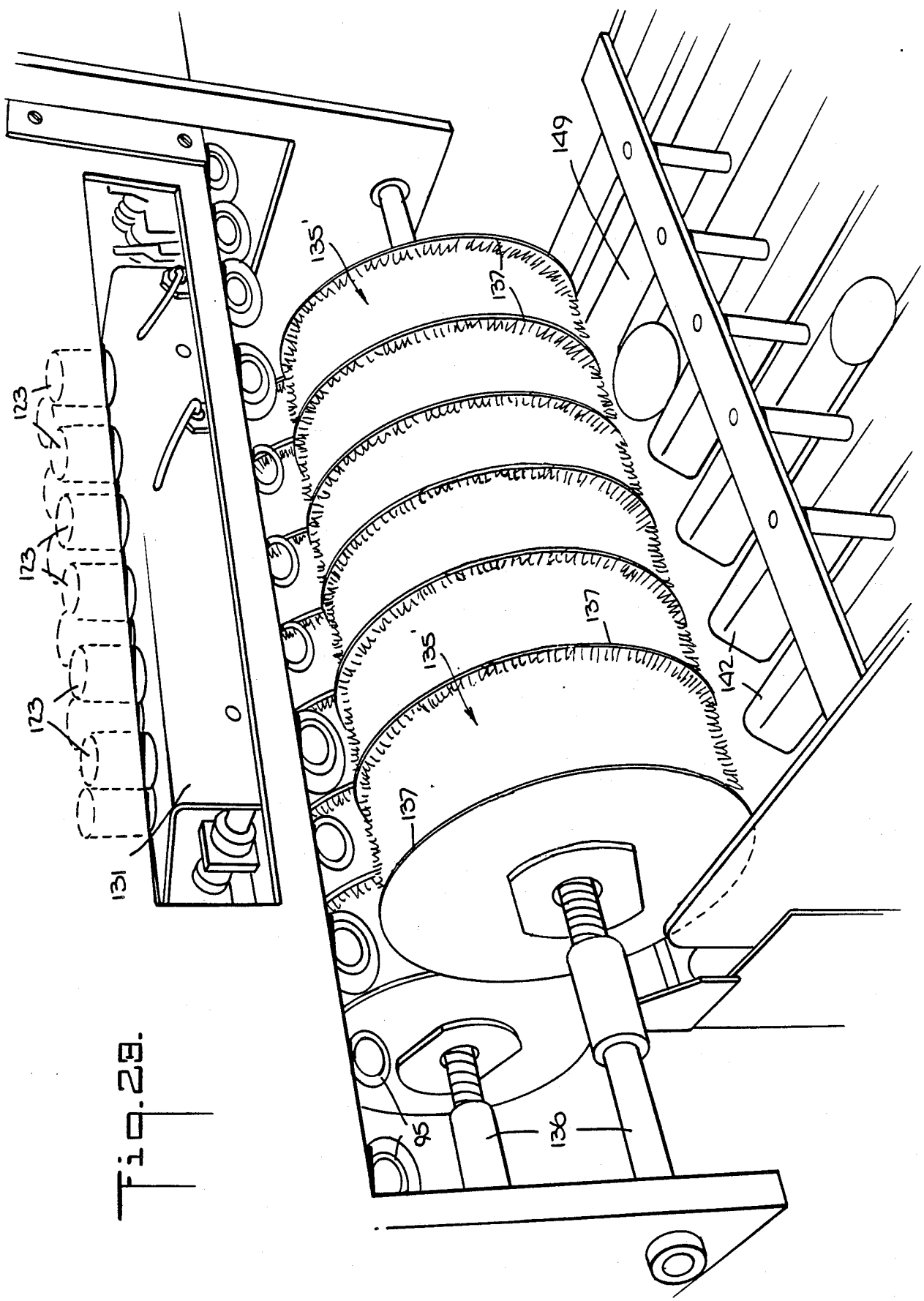
FIG. 23 is a partial, perspective view of the receiving station illustrated in FIG. 22.
Figure 24:
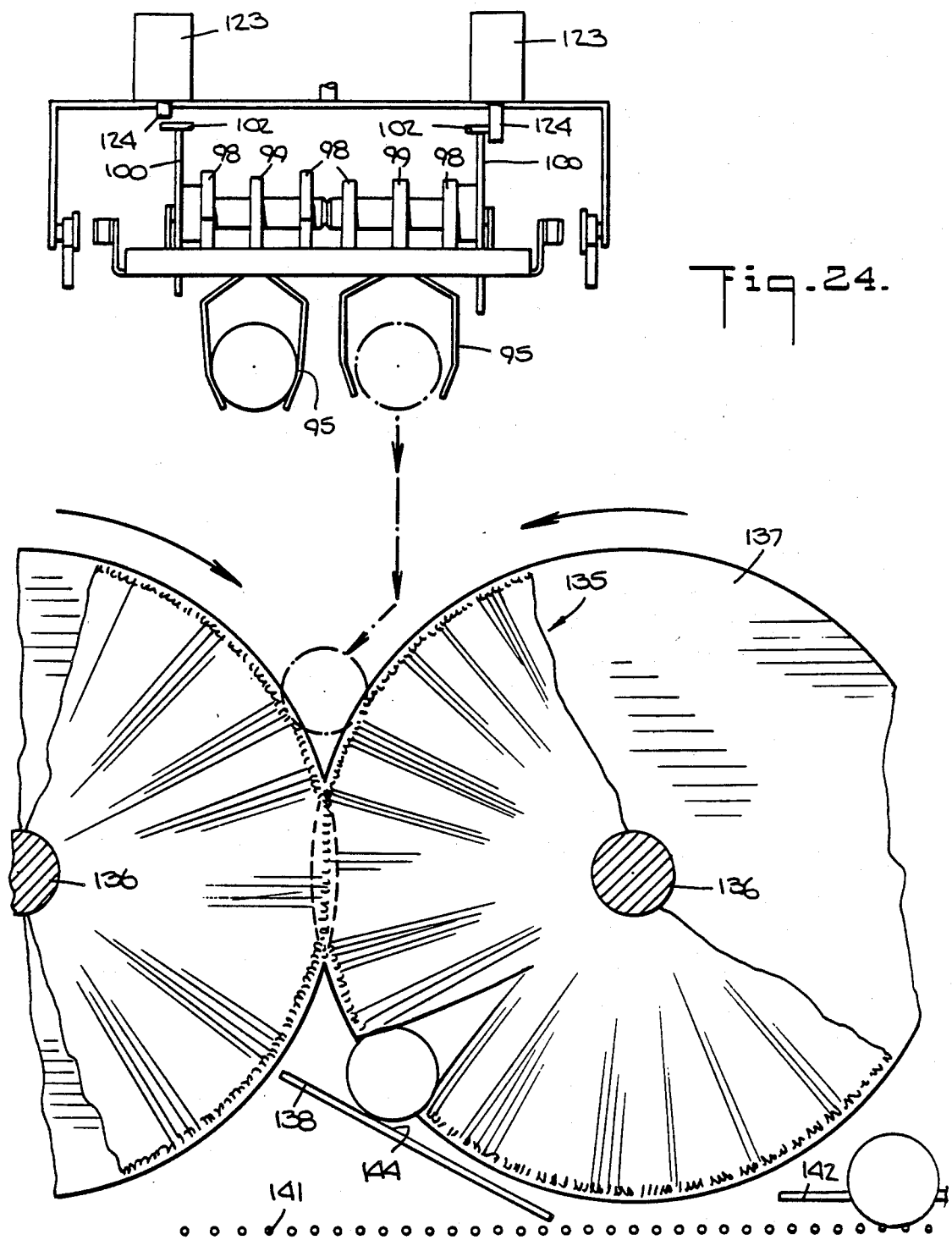
FIG. 24 is a cross-sectional view of the receiving station.

Referring now to FIGS. 22 through 24, the receiving stations of the egg processing system receive eggs carried in adjacent pairs by carriage assemblies 92. The carriage assemblies 92 convey the eggs in spaced-apart, side-by-side pairs to the receiving stations and are coupled to common chain members 93 on each side of the conveyor which drive the carriage assemblies. At each receiving station, a movable frame 121 (see FIG. 22) on which a plurality of solenoids 123, which activate plungers 124, are mounted, is slidably disposed on rails 125 located adjacent the chain members 93. The frame is coupled to a hydraulic cylinder 126 by means of an extension rod 127. A compression spring 128 is disposed over rod 127 and engages a stationary guide member 129 mounted on the rod at one end and a circular collar 130 mounted on the rod in spaced-apart relationship with respect to member 129 at its other end. The extension rod is rigidly coupled to frame 121 by means of another circular collar member 131. Cylinder 126 is coupled by a hydraulic pressure line 132 to a hydraulic pump 133 which is driven by a stepping motor 134 which also serves as the main drive motor for the egg conveyor.

Movable frame 121 is disposed over a pair of rotatable resilient cylinders 135 which are coaxially mounted on spaced drive shafts 136. In the embodiment of the invention illustrated in FIGS. 22-24, the cylinders comprise cylindrical brushes preferably fabricated with nylon bristles. A plurality of rotatable disks 137 are mounted on shafts 136 in order to define a plurality of channels in the cylinders for receiving eggs from the carriage assemblies. The cylinders are disposed vertically below movable frame 121 and carriage assemblies 92 and have their peripheral ends engaging and in slight interference with those of the adjacent cylinder. The peripheral end of the forwardmost cylinder is further disposed in a generally contiguous relationship with an elongated, flexible support member 138, which may comprise a sheet of plastic, such as mylar, stretched over and mounted on a frame extending axially along substantially the entire length of the cylinders. A conveyor belt 141, which may comprise a wire conveyor or a plurality of elongated strand members moving axially along the length of the conveyor, is disposed below the cylinders for conveying eggs received therefrom to an egg packer (not shown) which packs the eggs in cartons or trays as desired. Conveyor belt 141 is divided into a plurality of channels aligned with those formed in the cylinders by disks 137 by means of a plurality of elongated stationary guide members 142 (FIG. 23) which, in the illustrated embodiment of the invention, are disposed over the conveyor belt in close proximity thereto and have an inverted, V-shaped profile (i.e., are upwardly convex). Suitable drive means, such as an electric motor, is coupled to shafts 136 for rotating the cylinders so that the peripheral edges thereof rotate in opposite directions inwardly towards each other and downwardly and away from carriage assemblies 92, i.e., in a counter-clockwise direction. As can be readily seen in FIG. 24, support member 138 is upwardly inclined toward the rearwardmost shaft 136 with respect to the direction of movement of conveyor 141 and its uppermost surface 144 is disposed beneath and slightly spaced from the peripheral ends of cylinders 135. This surface may also be curved in a direction substantially in conformance with that of the forwardmost one of the cylinders in order to maintain contact between cylinders 135 and the eggs guided along member 138 onto conveyor 141.

Figure 25:
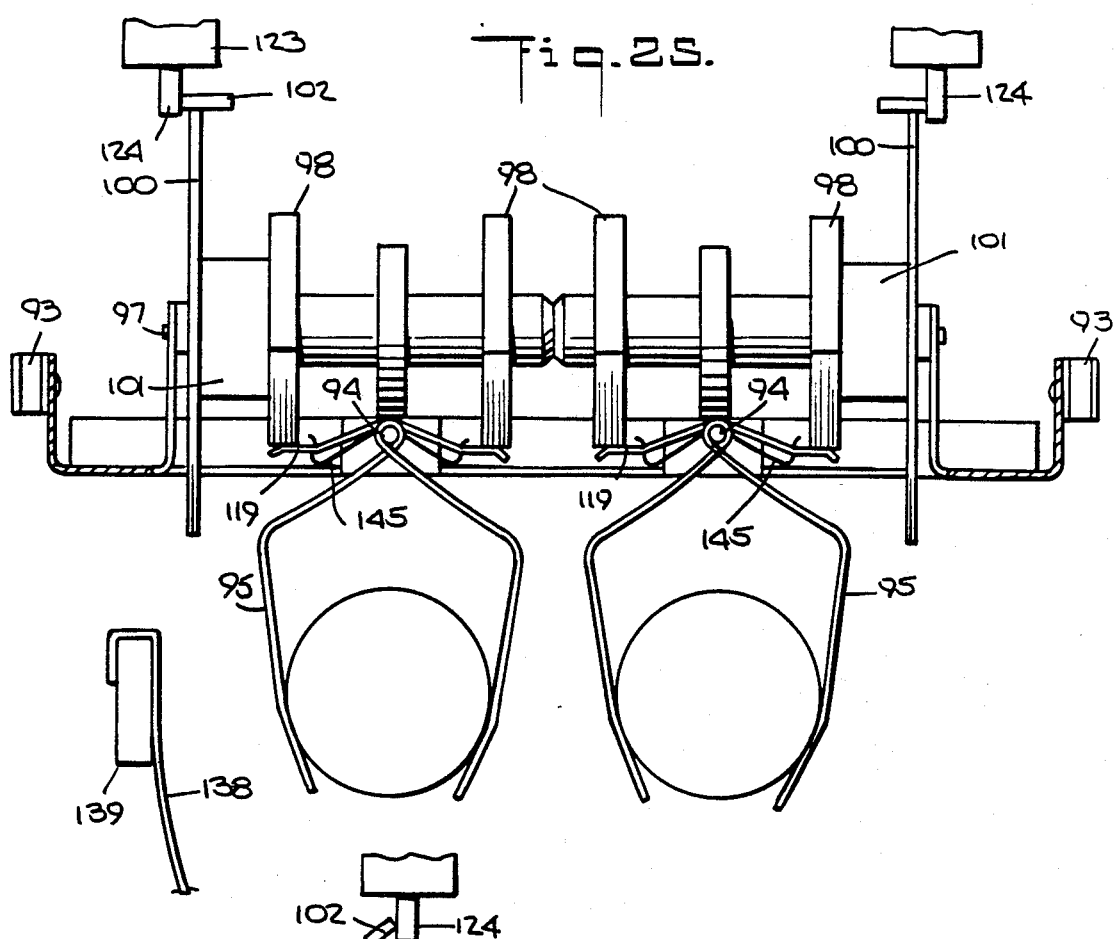
FIG. 25 is a cross-sectional view of the egg conveyor at the receiving station.
Figure 26:
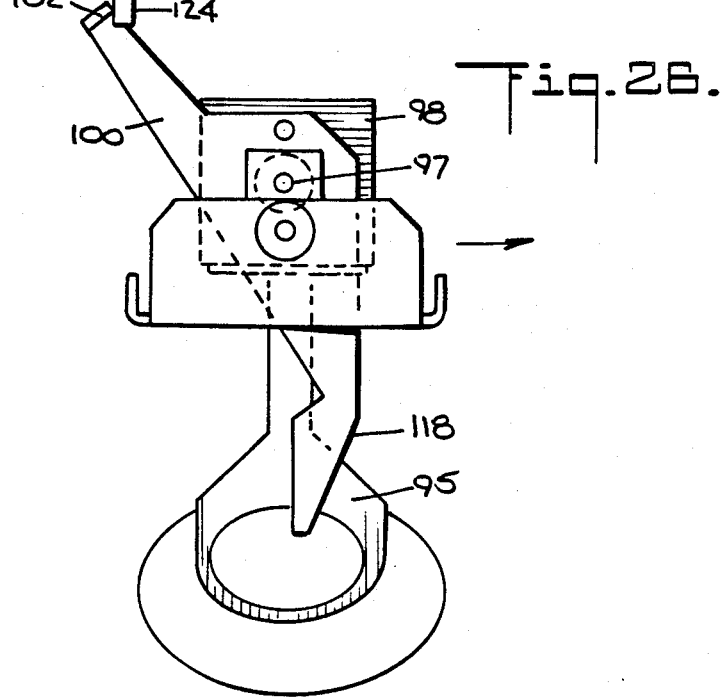
FIG. 26 is a partial longitudinal cross-sectional view of the egg conveyor at the receiving station.

In operation, eggs are carried by the prongs 95 of carriage assemblies 92 as illustrated in FIGS. 25 and 26 until they reach a receiving station of the egg grader. When the eggs arrive above the appropriate station, solenoids 123 are selectively actuated as described in copending application Ser. No. 394,161, filed July 1, 1982, entitled "Egg Handling System". Plungers 124 of solenoids 123 engage the upper T-sections 102 of extension bars 100 and cause the bars to rotate in a counter-clockwise direction about shaft 97, thereby releasing the eggs from the carriage assemblies. When plungers 124 are moved into the path of the carriage assemblies and engage T-sections 102 of the extension bars, the counter-clockwise rotation of the bars causes prongs 95 to pivot outwardly with respect to one another due to the force of spring 145 which urges prongs 95 toward their open position. The eggs are then released from the prongs, drop downwardly as shown in FIG. 24, and are caught by the cylinders 135 which slow the speed at which the eggs are falling and gently move the eggs downwardly and outwardly away from carriage assemblies 92 to support member 138 and into the channels of conveyor 141, which operates at a speed which is substantially less than that of the assembly conveyor.

Frame 121 is movable with respect to the cylinders 135 to accommodate variations or changes in the speed of carriage assemblies 92 which may vary during operation, depending upon the speed of the candler and weighing systems of the egg grader. As it varies, the position of frame 121 also varies with respect to cylinders 135 and the channels leading to the packer at each receiving station to compensate for changes in the forward drop trajectory of the eggs being released by prongs 95 at different conveyor speeds to assure that the eggs are received in the channels for which they are intended.

For example, when the speed of stepper motor 134 is increased by the operator of the system, the speed of assemblies 92 will also increase since the motor drive is coupled to the drive mechanism for the egg conveyor. Also, since pump 133 is coupled by a hydraulic line 145 to a valve 146 which is connected by a coupling 147 to hydraulic line 132 and is adjusted so that as the speed of motor 134 and assemblies 92 is increased, the flow of hydraulic fluid from pump 133 is controlled so as to cause hydraulic cylinder 126 to advance frame 121 in a direction opposite to the direction of movement of carriage assemblies 92 to a position sufficient to compensate for the forward trajectory of eggs released at that particular speed. The linear distance between frame 121 and prongs 95 of the carriage assemblies carrying the eggs to be released thus becomes effectively shorter. If the speed of assemblies 92 decreases, cylinder 126 similarly moves frame 121 in the opposite direction, i.e., in the same direction as the direction of movement of the carriage assemblies, to another position sufficient to compensate for the smaller forward drop trajectory of the eggs at the lower speed.

Figure 27:
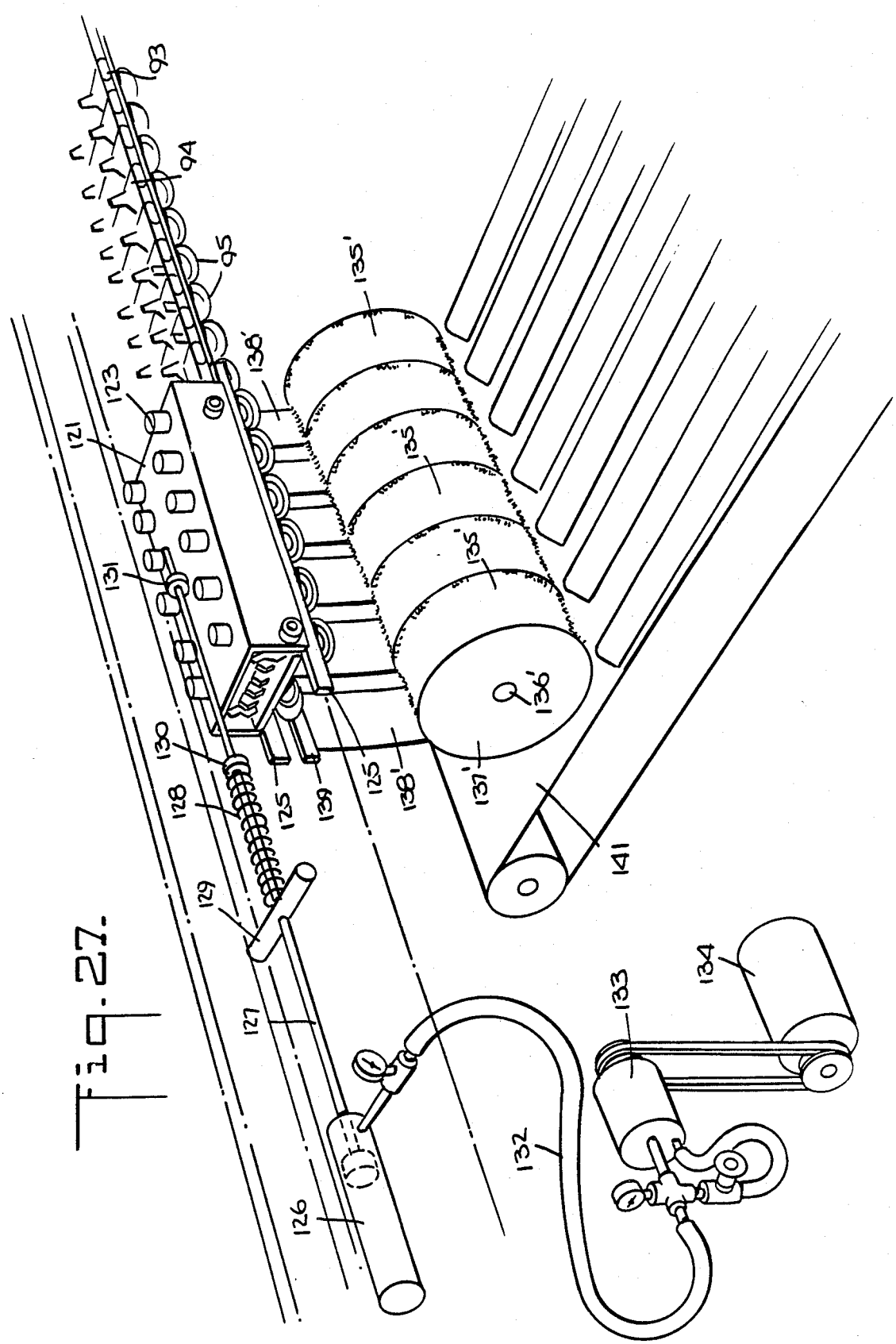
FIG. 27 is a perspective view of another embodiment of a receiving station of the egg processing system of the present invention.
Figure 28:
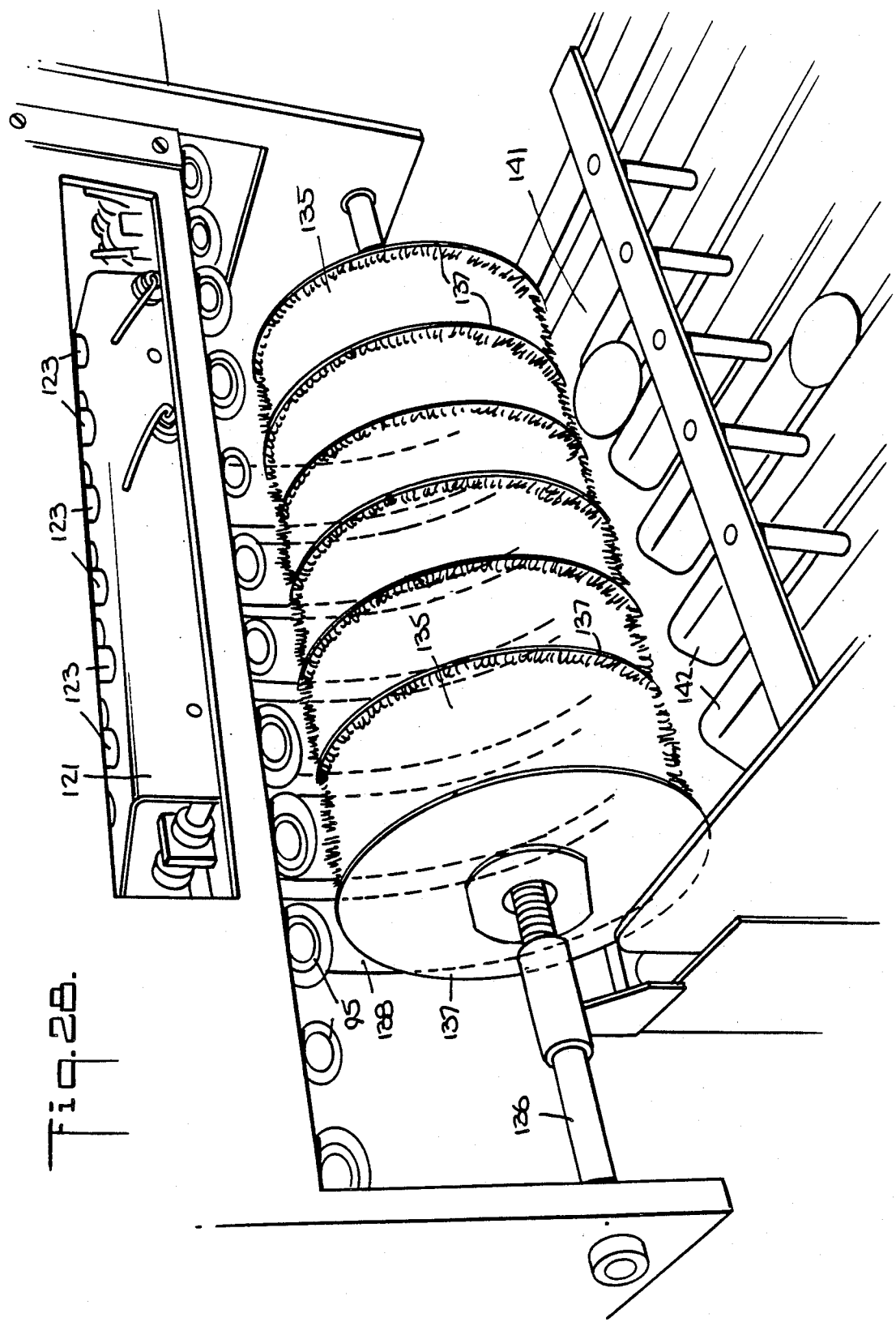
FIG. 28 is a partial, perspective view of the receiving station illustrated in FIG. 27.
Figure 29:
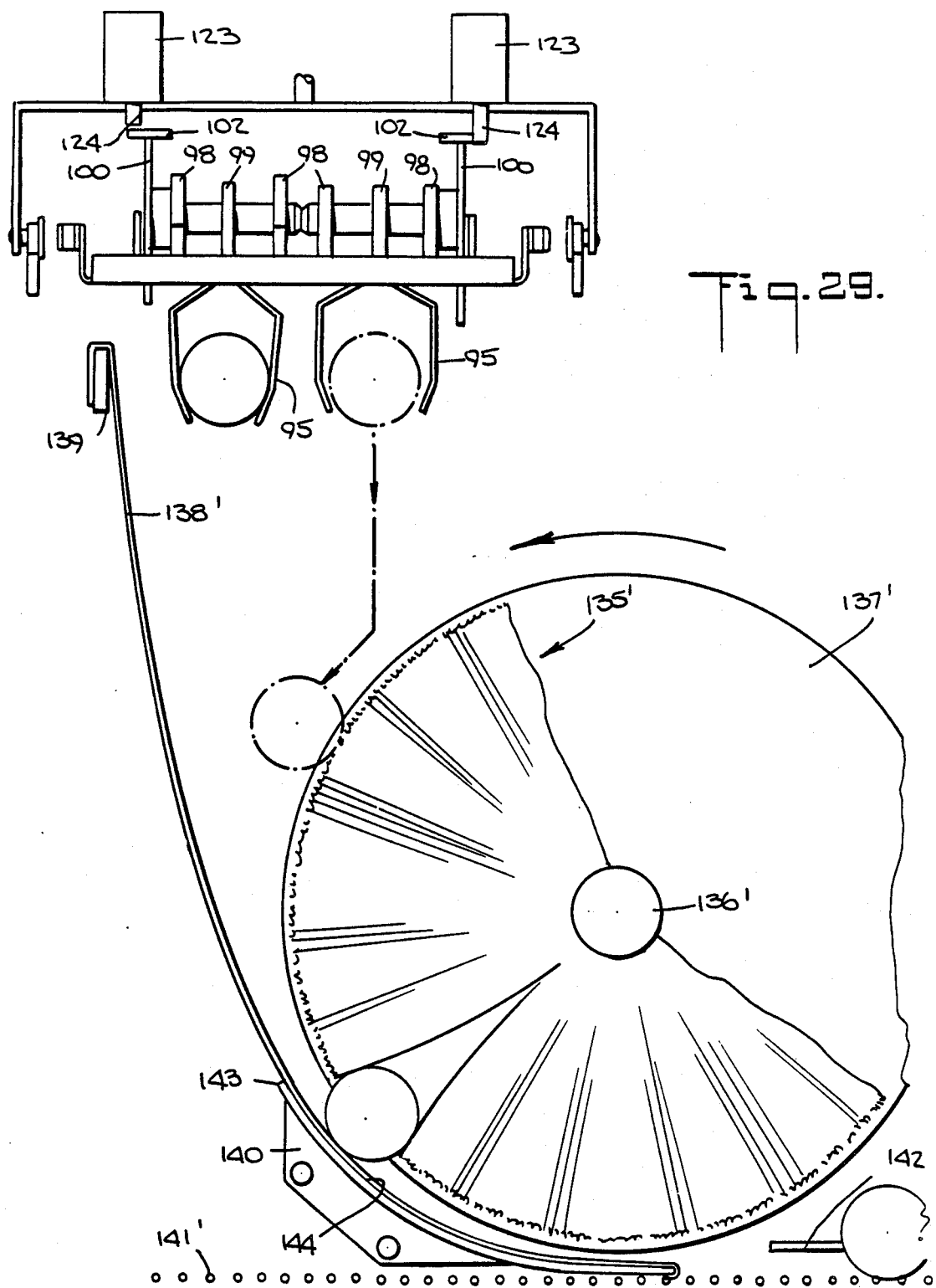
FIG. 29 is a cross-sectional view of the receiving station illustrated in FIG. 27.

FIGS. 27–29 illustrate another embodiment of the handling system of the invention in which frame 121 is disposed over a single rotatable resilient cylinder 135 mounted on drive shaft 136'. A plurality of rotatable disks 137 are also mounted on shaft 136' and define a plurality of channels for receiving eggs from the carriage assemblies 92. The cylinder is disposed below frame 121 and carriage assemblies 92 and has its peripheral end disposed generally contiguous and slightly spaced from a plurality of elongated flexible guide members 138', each of which may comprise a sheet of mylar plastic, fixed at one end to a stationary rail 139 disposed adjacent the egg conveyor and at the other end over the vertical lower end of a stationary, rigid, arcuate-shaped support member 140 disposed beneath the lower end of the cylinder. Conveyor belt 141 is disposed below the cylinder for conveying eggs received thereon to an egg packer (not shown) which packs the eggs into cartons or trays as desired and is divided into a plurality of channels aligned with the disks 137' by means of a plurality of elongated stationary guide members 142 which are upwardly convex in shape and are suspended over the conveyor belt in close proximity thereto. Suitable drive means, such as an electric motor, is coupled to shaft 136' for rotating the cylinder so that the peripheral end thereof rotates downwardly and away from carriage assemblies 92, i.e., in a counter-clockwise direction. As can be readily seen in FIG. 29, guide member 140 has an upper lip 143 disposed below shaft 136' about which cylinder 135 rotates and includes an egg-supporting surface 144' which is disposed beneath and spaced from the peripheral end of the cylinder. This surface is curved in a direction substantially in conformance with that of the cylinder (i.e., parallel thereto) in order to maintain contact between the cylinder and the eggs guided along members 138' and 140 onto conveyor 141. The cylinder may, as previously described, comprise a rotating brush fabricated from nylon bristles. Also other resilient members such as foam, inflatable means or the like may also be utilized.

In operation, eggs are carried by the prongs 95 of carriage assemblies 92 until they reach a receiving station of the egg grader. When the eggs arrive above the appropriate station solenoids 123 are selectively actuated as previously described so that plungers 124 of solenoids 123 engage the upper T-sections 102 of extension bars 100 and cause the bars to rotate in a counter-clockwise direction about shaft 97, thereby releasing the eggs from the carriage assemblies. The eggs then drop downwardly as shown in FIG. 29, and are caught by cylinder 135' and members 138' and 140. More specifically, the eggs are released prior to the receiving station, dependent upon the operating speed of the machine. The cylinder then carries the eggs downwardly and outwardly away from carriage assemblies 92 into the channels of conveyor 141.

It should be noted that although plurality of elongated guide members 138' have been illustrated in the drawings, a single elongated sheet member could also be used in conjunction with cylinder 135' to catch and guide the eggs released from the carriage assemblies toward conveyor 141.

Figure 30:
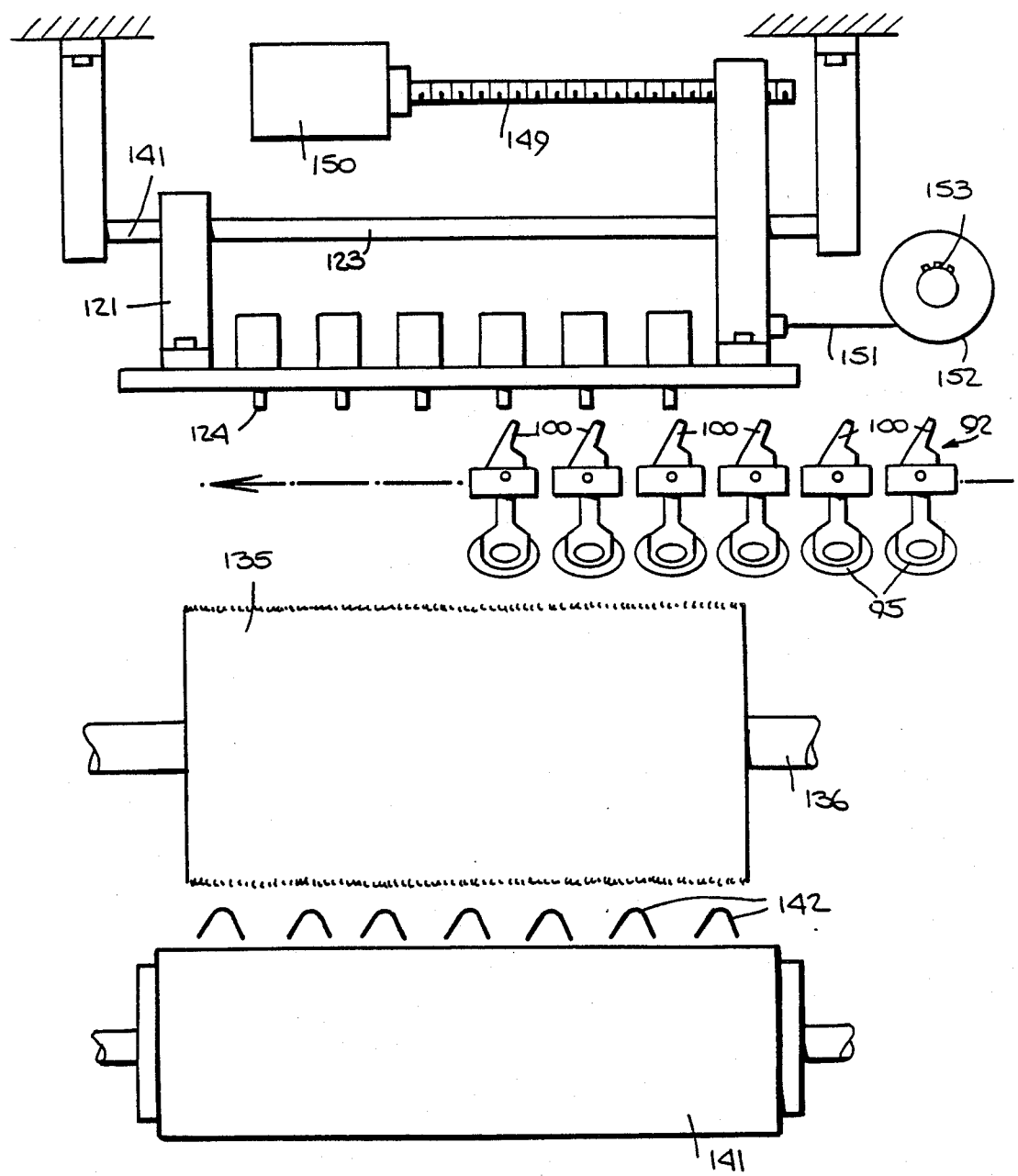
FIG. 30 is a side view of another embodiment of a receiving station of the egg processing system of the present invention.

FIG. 30 illustrates another embodiment of the receiving station in which frame 121 is slidably mounted on cylindrical rods 148 and is coupled to an elongated threaded shaft 149 driven by a reversible motor 150. The position of the frame 121 with respect to the cylinders 135 is adjusted by energizing motor 150 until it is moved to a predetermined position for a particular motor speed at which the conveyor is to operate. The frame is coupled by a cable 151 to a pulley 152 connected to a main drive motor speed control 153 which controls the motor which drives the egg conveyor. Thus, when the position of frame 121 is adjusted to the location corresponding to the particular speed at which the conveyor is to operate, cable 151 will be either wound or unwound on pulley 152 so as to rotate speed control 153 and adjust the speed of the drive motor for the conveyor. As in the embodiment of the inventions previously described, the position of the solenoids carried by frame 121 and, hence, the trajectory of the eggs released by carriage assemblies 92 at the receiving station, are synchronized at all speeds. Speed control 153 may comprise any suitable device for controlling the speed of a motor, such as a potentiometer, shaft encoder or the like. In other respects, the operation of this embodiment of the invention is the same as those previously described.

Figure 31:
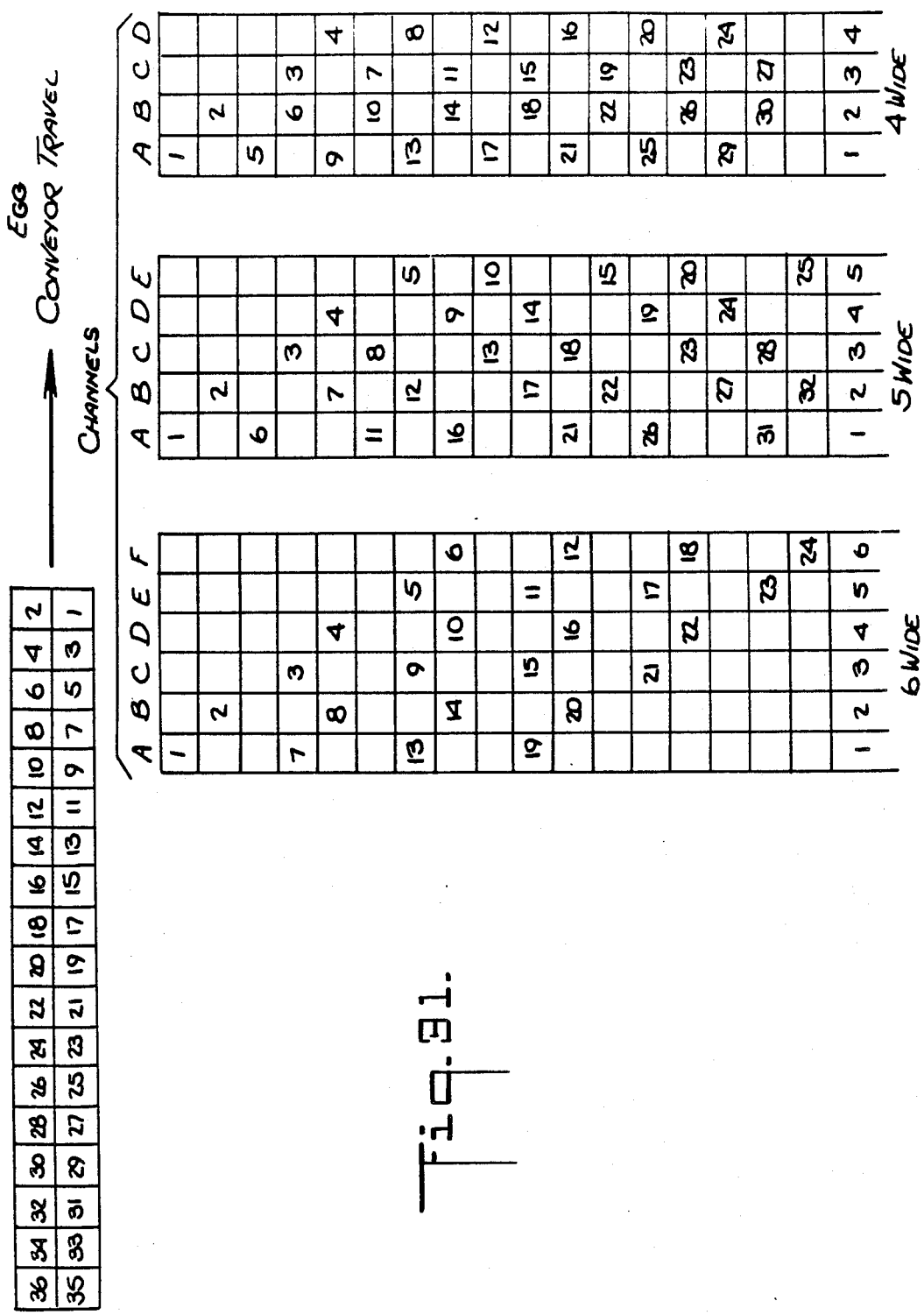
FIG. 31 is a schematic illustration of the sequence in which eggs are dropped into the receiving station from the egg conveyor.

As shown in FIG. 31, release of the eggs from the carriage assemblies is selectively controlled so as to drop the eggs successively into the channels formed by disks 137 and 137' in cylinders 135 and 135' and members 142 on conveyor 141 beginning with the first such channel reached by the eggs as they are conveyed by carriage assemblies 92 to the receiving station. Sequences which may be used for six, five and four channels, respectively, are illustrated in the drawing. By releasing the eggs from the carriage assemblies into the cylinders 135 and 135' as described, i.e., over the entire axial length of the area of the cylinders available for receiving the eggs, an even distribution of the eggs is obtained in the channels of conveyor 141.

Generally speaking, all eggs which have been determined to have identical or similar physical characteristics are preferably dropped in the channels at one receiving station in the sequence illustrated in FIG. 31. For example, egg no. 1 will be dropped in channel A, egg no. 2 in channel B, etc. until all the channels have received an egg, whereupon the process is repeated.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly to be regarded in an illustrative rather than in a restrictive sense.

What is claimed is:

1. Apparatus for transferring eggs from variable speed conveying means to a receiving station which comprises:
    means for continuously conveying the eggs to the vicinity of the receiving station;
    egg receiving means at the receiving station disposed below the conveying means;
    means for releasing the eggs at a point prior to the egg receiving means depending upon the speed of the conveying means, the position with respect to said receiving means at which said eggs are released being varied according to the speed at which said eggs are conveyed on said conveying means;
    means operatively communicative with drive means for said conveying means and responsive to said drive means and coupled to said releasing means, for varying the position of said releasing means with respect to said receiving station according to the speed of said conveying means, said means for varying being responsive to variations in the speed of said conveying means thereby to adjust the position of said releasing means to compensate for said variations in the speed of said conveying means; and
    means for retrieving the released eggs in the receiving means and routing the eggs for packaging.

2. Apparatus for transferring eggs from a variable speed conveying means to a receiving station which comprises:
    means for continuously conveying the eggs to the vicinity of the receiving station;
    egg receiving means at the receiving station disposed below the conveying means;
    means disposed adjacent to said conveying means at said receiving station, for releasing eggs from said conveying means at said receiving station;
    motor means for moving said releasing means with respect to said receiving station;
    drive means coupled to the conveying means for moving said conveying means;
    means operatively communicative with the drive means for said conveying means and coupled to the releasing means and responsive to the position of the releasing means, for varying the operational speed of said drive means in accordance with the position of said releasing means with respect to said receiving station when the position of said releasing means is changed by said motor means during operation of the apparatus, said means for varying being responsive to variations in the position of said releasing means thereby to adjust the speed of said drive means to compensate for variations in the position of said releasing means during operation of said apparatus; and
    means for retrieving the released eggs in the receiving means and routing the eggs for packaging.

* * * * *